(12) United States Patent
Kinoshita

(10) Patent No.: US 12,110,932 B2
(45) Date of Patent: Oct. 8, 2024

(54) DISC BRAKE AND LAMINATED SHIM

(71) Applicant: Hitachi Astemo, Ltd., Ibaraki (JP)

(72) Inventor: Takayuki Kinoshita, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 382 days.

(21) Appl. No.: 17/439,525

(22) PCT Filed: Nov. 22, 2019

(86) PCT No.: PCT/JP2019/045798
§ 371 (c)(1),
(2) Date: Sep. 15, 2021

(87) PCT Pub. No.: WO2020/213202
PCT Pub. Date: Oct. 22, 2020

(65) Prior Publication Data
US 2022/0154790 A1 May 19, 2022

(30) Foreign Application Priority Data
Apr. 17, 2019 (JP) .................................. 2019-078766

(51) Int. Cl.
*F16D 65/095* (2006.01)
*F16D 65/02* (2006.01)
(52) U.S. Cl.
CPC .... *F16D 65/095* (2013.01); *F16D 2065/1392* (2013.01)
(58) Field of Classification Search
CPC ............... F16D 65/095; F16D 65/0971; F16D 2065/1392; F16D 2065/785
See application file for complete search history.

(56) References Cited

U.S. PATENT DOCUMENTS 5,975,252 A * 11/1999 Suzuki ............... F16D 65/0971
188/73.1
6,116,384 A * 9/2000 Matsumoto ......... F16D 65/0971
188/73.31
(Continued)

FOREIGN PATENT DOCUMENTS

CN 102852999 A * 1/2013 ........... F16D 55/226
DE 3402866 A1 * 9/1984
(Continued)

OTHER PUBLICATIONS

International Search Report received in corresponding International Application No. PCT/JP2019/045798 mailed Dec. 24, 2019.
(Continued)

*Primary Examiner* — Vishal R Sahni
(74) *Attorney, Agent, or Firm* — MATTINGLY & MALUR, PC

(57) ABSTRACT

This disc brake includes a first shim that has a first flat plate portion and claw portions curved from an outer edge side of the first flat plate portion and attached to an outer circumferential surface of a rear plate; and a second shim that has a second flat plate portion disposed in a manner of being sandwiched between the first flat plate portion and the rear plate, and a bent portion curved from an outer edge side of the second flat plate portion to the first flat plate portion side. Relative movement of the second shim with respect to the first shim on a plane parallel to the second flat plate portion is restricted. A leading end portion of the bent portion of the second shim is disposed within a projection plane of a largest flat surface portion of the rear plate in a disc axial direction.

4 Claims, 16 Drawing Sheets

(56) References Cited

U.S. PATENT DOCUMENTS

| | | | |
|---|---|---|---|
| 8,505,699 B2 * | 8/2013 | Kappagantu | F16D 65/0018 188/73.1 |
| 2004/0163903 A1 * | 8/2004 | Saka | F16D 65/0971 188/250 G |
| 2014/0090932 A1 | 4/2014 | Wakabayashi et al. | |
| 2014/0360822 A1 | 12/2014 | Kobayashi et al. | |
| 2015/0354646 A1 * | 12/2015 | Osada | F16D 65/0971 188/73.37 |
| 2018/0283479 A1 * | 10/2018 | Tamaoki | F16D 65/0006 |
| 2019/0120306 A1 | 4/2019 | Satoh et al. | |
| 2022/0154790 A1 * | 5/2022 | Kinoshita | F16D 65/095 |

FOREIGN PATENT DOCUMENTS

| | | | | |
|---|---|---|---|---|
| JP | 58-187632 U | | 12/1983 | |
| JP | 64-32940 U | | 3/1989 | |
| JP | H06129451 A | * | 10/1992 | |
| JP | 2002-364685 W | | 12/2002 | |
| JP | 2006200560 A | * | 8/2006 | |
| JP | 5085591 B2 | * | 11/2012 | |
| JP | 2015232341 A | * | 12/2015 | F16D 65/092 |
| WO | WO-2013039174 A1 | * | 3/2013 | |
| WO | 2017/183585 A1 | | 10/2017 | |
| WO | WO-2018181150 A1 | * | 10/2018 | |
| WO | WO-2020105611 A1 | * | 5/2020 | |

OTHER PUBLICATIONS

Written Opinion received in corresponding International Application No. PCT/JP2019/045798 mailed Dec. 24, 2019.
Indian Office Action received in corresponding Indian Application No. 202117040821 dated Mar. 21, 2022.
German Office Action received in corresponding German Application No. 11 2019 007 224.2 dated Jun. 4, 2024.

* cited by examiner

DISC BRAKE AND LAMINATED SHIM

TECHNICAL FIELD

The present invention relates to a disc brake and a laminated shim.

This application claims priority based on Japanese Patent Application No. 2019-078766, filed Apr. 17, 2019, the content of which is incorporated herein by reference.

BACKGROUND ART

A friction pad for a disc brake having a structure in which a hole is formed in the vicinity of the center of a thin metal plate, a projection is formed in a shim in a manner corresponding thereto, and the projection is inserted into the hole is known (for example, refer to Patent Literature 1).

CITATION LIST

Patent Literature

[Patent Literature 1]
  Japanese Unexamined Utility Model Application, First Publication No. S58-187632

SUMMARY OF INVENTION

Technical Problem

In disc brakes, it is desired that erroneous assembly of a shim with respect to a friction pad be curbed.

The present invention provides a disc brake and a laminated shim capable of curbing erroneous assembly of a shim with respect to a friction pad.

Solution to Problem

According to an aspect of the present invention, there is provided a disc brake including a first shim that has a first flat plate portion and claw portions curved from an outer edge side of the first flat plate portion and attached to an outer circumferential surface of a rear plate; and a second shim that has a second flat plate portion disposed in a manner of being sandwiched between the first flat plate portion of the first shim and the rear plate, and a bent portion curved from an outer edge side of the second flat plate portion to the first flat plate portion side. Relative movement of the second shim with respect to the first shim on a plane parallel to the second flat plate portion is restricted. A leading end of the bent portion of the second shim is disposed within a projection plane of a largest flat surface portion of the rear plate in a disc axial direction.

Advantageous Effects of Invention

According to the disc brake and the laminated shim described above, it is possible to curb erroneous assembly of a shim with respect to a friction pad.

DESCRIPTION OF EMBODIMENTS

First Embodiment

A first embodiment will be described below with reference to FIGS. 1 to 14. A disc brake 10 of the first embodiment is for a vehicle such as an automobile and applies a braking force to a vehicle. Specifically, the disc brake 10 is for braking a front wheel of a four-wheeled automobile. The disc brake 10 brakes a vehicle by stopping rotation of a disc 11 having a disc shape rotating together with a wheel (not illustrated). Hereinafter, a direction of a center axis of the disc 11 will be referred to as a disc axial direction, a radial direction of the disc 11 will be referred to as a disc radial direction, and a circumferential direction of the disc 11, namely, a rotation direction will be referred to as a disc rotation direction. In addition, a central side of the disc 11 in the disc radial direction will be referred to as a side inward in the disc radial direction, and a side opposite to the center of the disc 11 in the disc radial direction will be referred to as a side outward in the disc radial direction.

Figure 1:
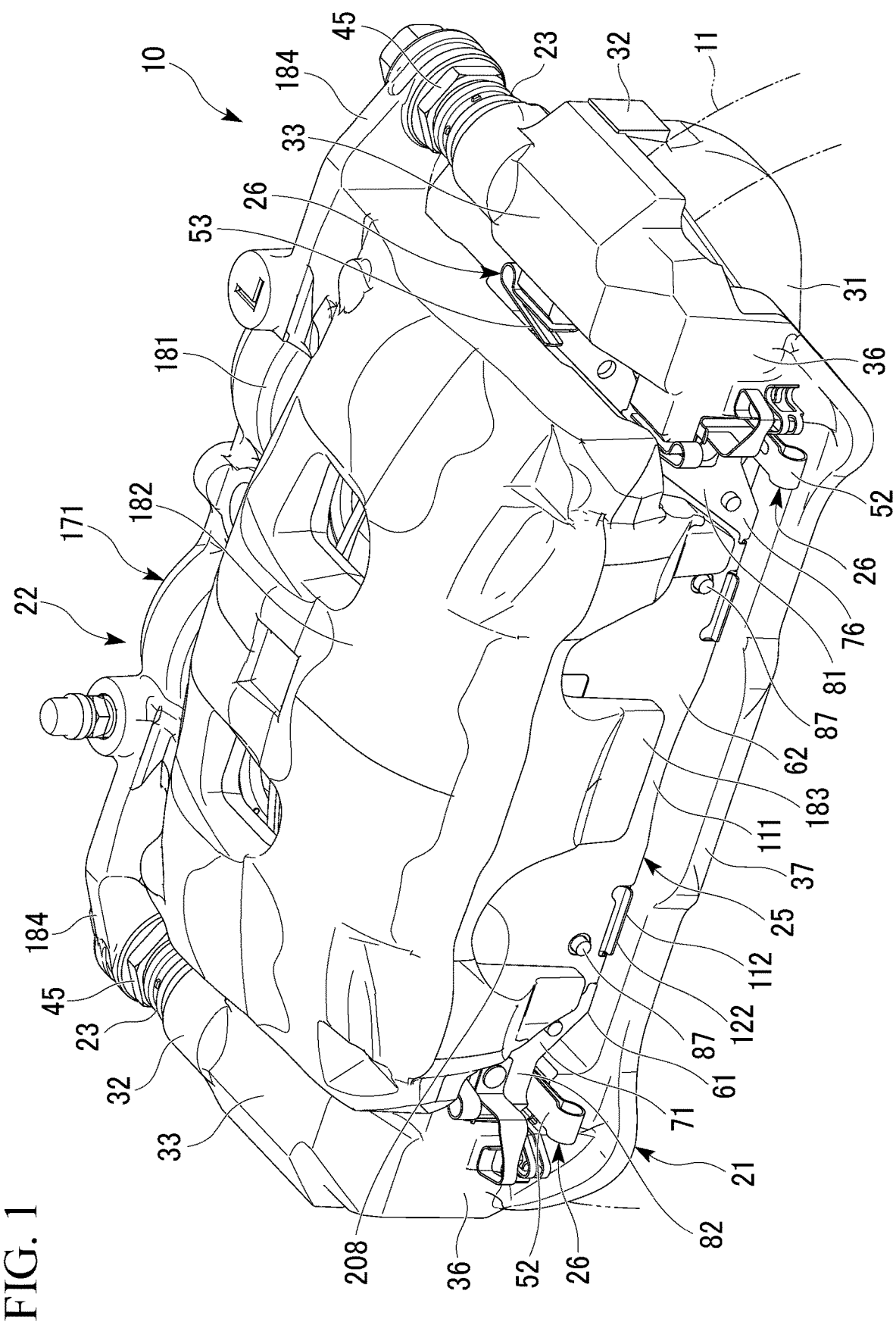
FIG. 1 is a perspective view illustrating a disc brake of a first embodiment.
Figure 2:
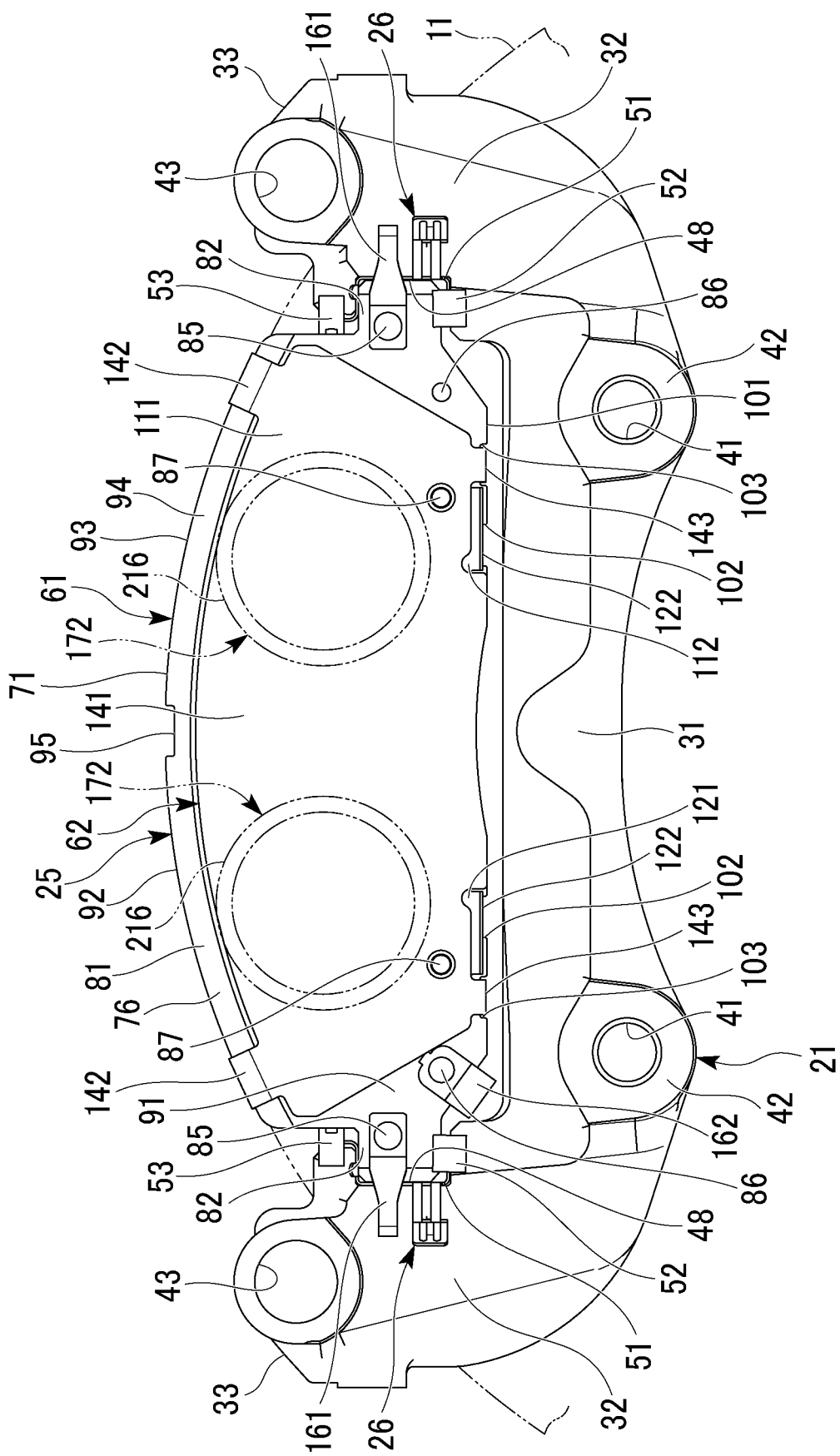
FIG. 2 is a rear view illustrating the disc brake of the first embodiment excluding a caliper.
Figure 3:
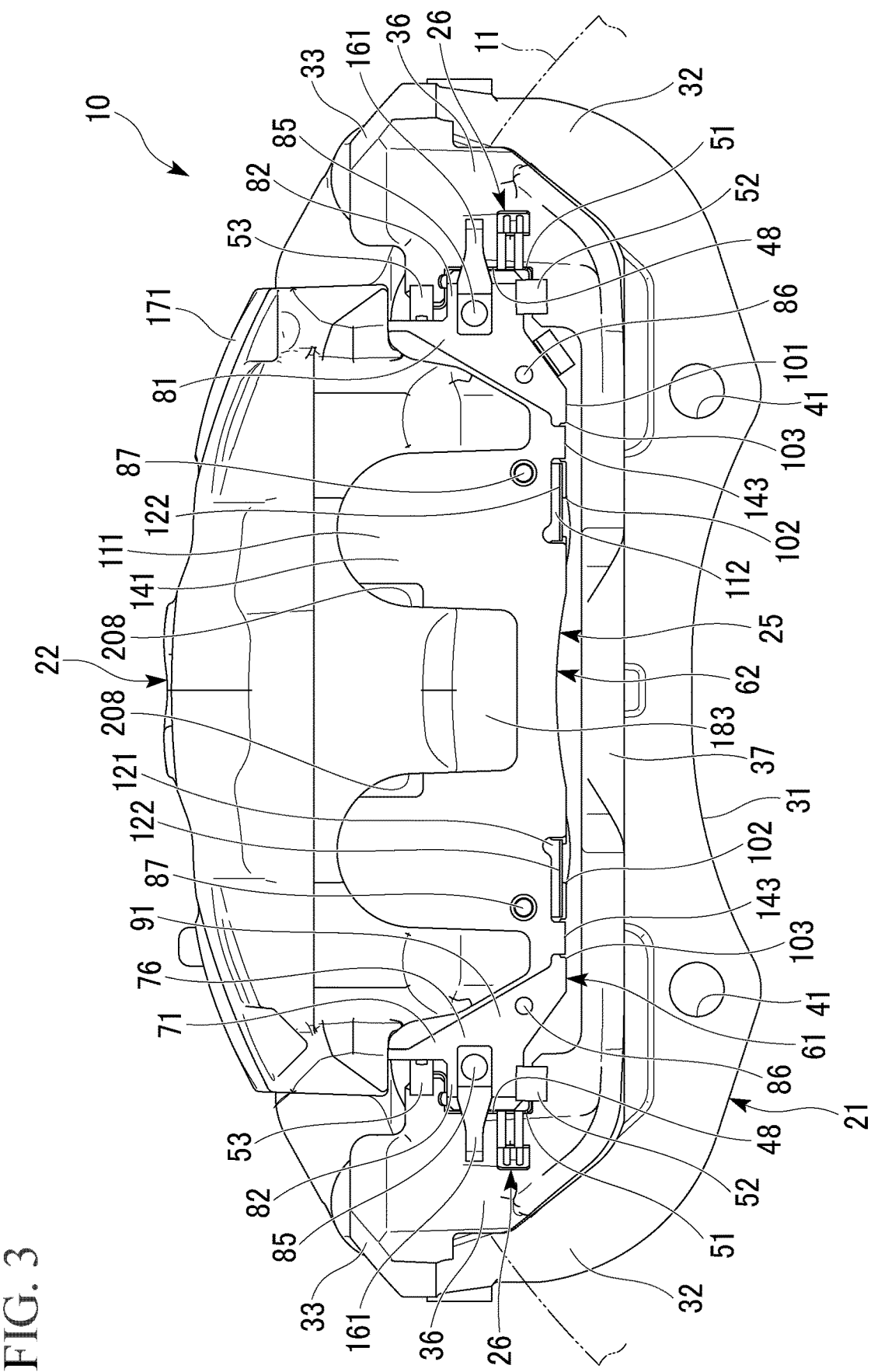
FIG. 3 is a front view illustrating the disc brake of the first embodiment.

As illustrated in FIG. 1, the disc brake 10 includes an attachment member 21, a caliper 22, and a pair of boots 23. As illustrated in FIGS. 2 and 3, the disc brake 10 includes a pair of friction pad assemblies 25 and four pad springs 26.

As illustrated in FIG. 2, the attachment member 21 has an inner beam portion 31, a pair of inner side torque receiving portions 32, and a pair of pin insertion fitting portions 33. As illustrated in FIG. 3, the attachment member 21 has a pair of outer side torque receiving portions 36 and an outer beam portion 37. The attachment member 21 has a mirror-symmetrical shape with respect to the center in the disc rotation direction.

As illustrated in FIG. 1, the inner beam portion 31 is disposed on one side in the disc axial direction with respect to the disc 11 and is attached to a non-rotation part of a vehicle. The non-rotation part of a vehicle, to which the attachment member 21 is attached, is disposed on a side inward in a vehicle width direction of the vehicle with respect to the disc 11, that is, on an inner side. The inner beam portion 31 attached to this non-rotation part is also disposed on the inner side with respect to the disc 11. As illustrated in FIG. 2, the inner beam portion 31 is disposed such that it extends in the disc rotation direction. In the inner beam portion 31, a pair of attachment boss portions 42 respectively having attachment holes 41 are provided on both sides in the disc rotation direction. The inner beam portion 31 is attached to the non-rotation part of the vehicle in the pair of attachment boss portions 42.

In the pair of inner side torque receiving portions 32, one inner side torque receiving portion 32 extends outward in the disc radial direction from an end portion of the inner beam portion 31 on one side in the disc rotation direction. In addition, in the pair of inner side torque receiving portions 32, the other inner side torque receiving portion 32 extends outward in the disc radial direction from an end portion of the inner beam portion 31 on the other side in the disc rotation direction. Similar to the inner beam portion 31, the pair of inner side torque receiving portions 32 are disposed on the inner side with respect to the disc 11.

As illustrated in FIG. 1, in the pair of pin insertion fitting portions 33, one pin insertion fitting portion 33 extends outward in the vehicle width direction, that is, to an outer side in a manner of straddling an outer circumferential side of the disc 11 in the disc axial direction from an end portion on a side outward in the disc radial direction in the inner side torque receiving portion 32 on one side in the disc rotation direction. In the pair of pin insertion fitting portions 33, the other pin insertion fitting portion 33 extends to the outer side in a manner of straddling the outer circumferential side of the disc 11 in the disc axial direction from an end portion on a side outward in the disc radial direction in the inner side torque receiving portion 32 on the other side in the disc rotation direction.

As illustrated in FIG. 2, a pin insertion hole 43 extending in the disc axial direction is formed in each of one inner side torque receiving portion 32 and one pin insertion fitting portion 33 connected to one inner side torque receiving portion 32, and the other inner side torque receiving portion 32 and the other pin insertion fitting portion 33 connected to the other inner side torque receiving portion 32. The pair of pin insertion holes 43 are respectively formed from end surfaces of the inner side torque receiving portions 32 on a side opposite to the pin insertion fitting portions 33 in the disc axial direction to positions in the middle inside the pin insertion fitting portions 33.

In the attachment member 21, a pair of slide pins 45 on both sides of the caliper 22 (illustrated in FIG. 1) in the disc rotation direction are fitted into the pair of pin insertion holes 43 in a slidable manner. Accordingly, the attachment member 21 supports the caliper 22 in a slidable manner in the disc axial direction in the pair of pin insertion fitting portions 33 thereof. In other words, in the caliper 22, the pair of slide pins 45 provided on both sides in the disc rotation direction are respectively fitted into the corresponding pin insertion holes 43 of the attachment member 21 in a slidable manner. Accordingly, the caliper 22 is provided in the attachment member 21 in a manner of being able to be displaced in the disc axial direction.

In the pair of outer side torque receiving portions 36, one outer side torque receiving portion 36 extends inward in the disc radial direction from an end portion on a side opposite to the inner side torque receiving portion 32, that is, on the outer side in the pin insertion fitting portion 33 on one side in the disc rotation direction. In the pair of outer side torque receiving portions 36, the other outer side torque receiving portion 36 extends inward in the disc radial direction from an end portion on the outer side of the pin insertion fitting portion 33 on the other side in the disc rotation direction. The pair of outer side torque receiving portions 36 are disposed on the outer side with respect to the disc 11.

The outer beam portion 37 extends in the disc rotation direction and connects sides inward in the disc radial direction in the pair of outer side torque receiving portions 36 to each other. Similar to the pair of outer side torque receiving portions 36, the outer beam portion 37 is disposed on the outer side with respect to the disc 11.

As described above, the attachment member 21 is disposed in a manner of straddling the outer circumferential side of the disc 11 and is attached to the non-rotation part of the vehicle. The inner beam portion 31 and the pair of inner side torque receiving portions 32 are disposed on the inner side that is a side to be attached to the non-rotation part of the vehicle in the attachment member 21, and the pair of outer side torque receiving portions 36 and the outer beam portion 37 are disposed on the outer side that is a side opposite to the inner side in the attachment member 21.

As illustrated in FIGS. 2 and 3, pad guide portions 48 having similar recessed shapes are respectively formed in the pair of inner side torque receiving portions 32 and the pair of outer side torque receiving portions 36.

That is, as illustrated in FIG. 2, in one inner side torque receiving portion 32, the pad guide portion 48 having a shape recessed outward in the disc rotation direction (a side opposite to the center of the attachment member 21 in the disc rotation direction) from a surface thereof on a side inward in the disc rotation direction (the central side of the attachment member 21 in the disc rotation direction) is formed. Also in the other inner side torque receiving portion 32, the pad guide portion 48 having a shape recessed outward in the disc rotation direction from a surface thereof on a side inward in the disc rotation direction is formed. Thus, in the pair of inner side torque receiving portions 32, the pad guide portions 48 having recessed shapes recessed in a direction in which they are separated in the disc rotation direction are formed on respective sides facing each other. One friction pad assembly 25 of the pair of friction pad assemblies 25 is supported by the pair of pad guide portions 48 provided in the pair of inner side torque receiving portions 32.

As illustrated in FIG. 3, in one outer side torque receiving portion 36, the pad guide portion 48 having a shape recessed outward in the disc rotation direction from a surface thereof on a side inward in the disc rotation direction is formed. Also in the other outer side torque receiving portion 36 on the other side in the disc rotation direction, the pad guide portion 48 having a shape recessed outward in the disc rotation direction from a surface thereof on a side inward in the disc rotation direction is formed. Thus, in the pair of outer side torque receiving portions 36, the pad guide portions 48 having recessed shapes recessed in a direction in which they are separated in the disc rotation direction are formed on respective sides facing each other. The other friction pad assembly 25 of the pair of friction pad assemblies 25 is supported by the pair of pad guide portions 48 provided in the pair of outer side torque receiving portions 36.

As illustrated in FIGS. 2 and 3, the pad springs 26 are individually attached to the pair of inner side torque receiving portions 32 and the pair of outer side torque receiving portions 36 at respective positions of the pad guide portions 48. Each of the pad springs 26 has a recessed guide portion 51 fitted into the pad guide portion 48, a radial direction biasing portion 52 biasing the friction pad assemblies 25 outward in the disc radial direction, and a rotation direction biasing portion 53 biasing the friction pad assemblies 25 to the central side in the disc rotation direction.

Figure 4:
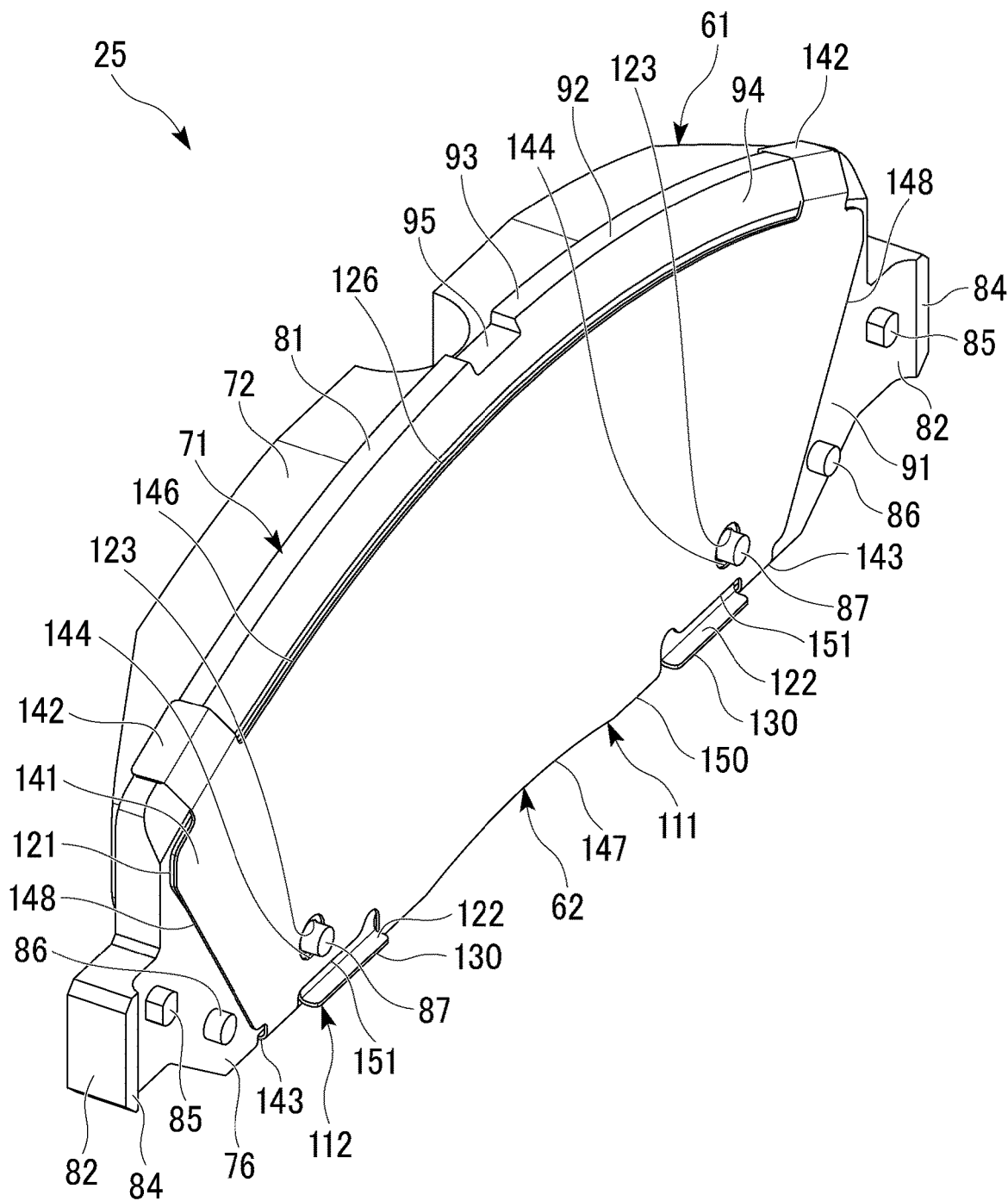
FIG. 4 is a perspective view illustrating a friction pad assembly of the disc brake of the first embodiment in a normal assembly state.
Figure 5:
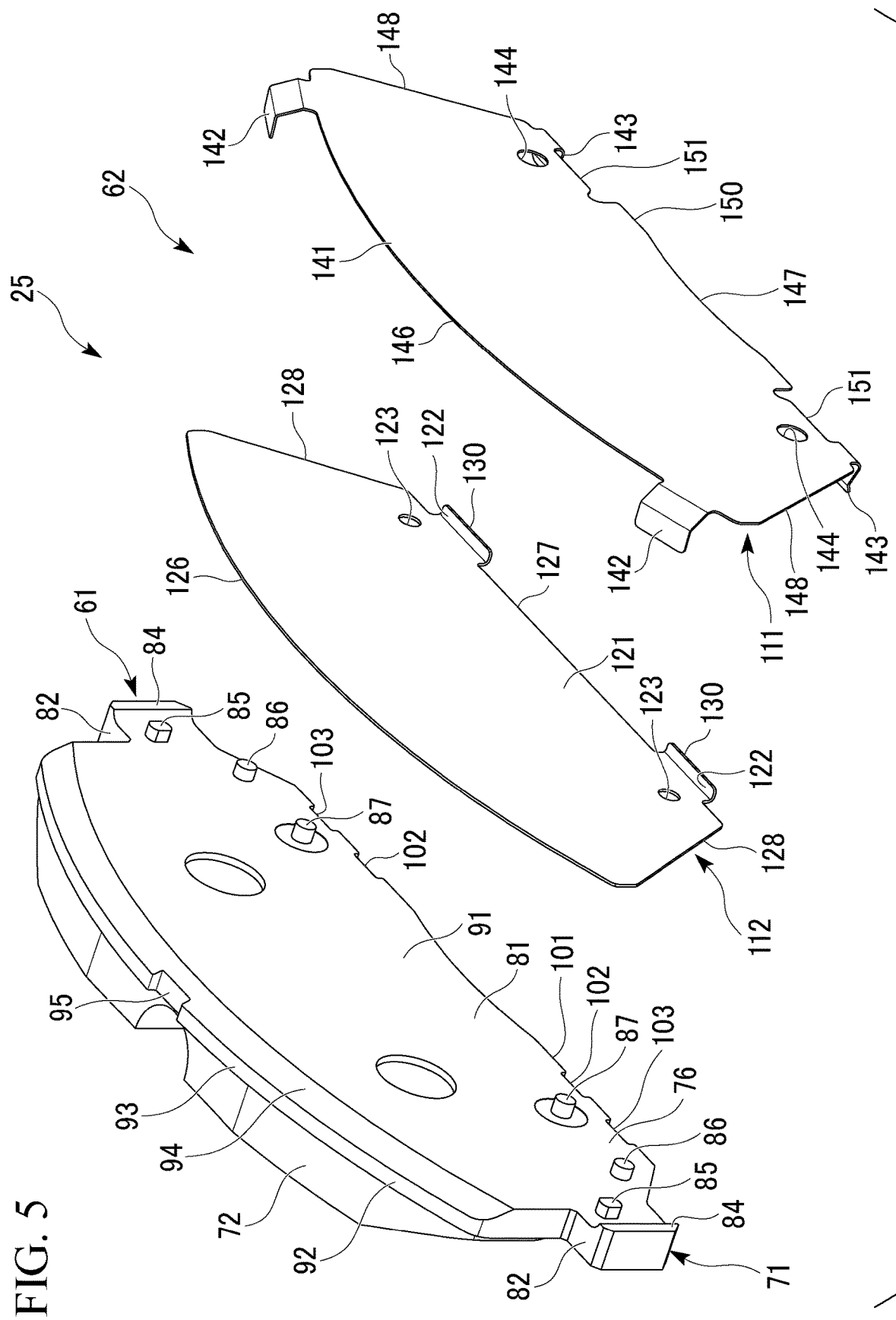
FIG. 5 is an exploded perspective view illustrating the friction pad assembly of the disc brake of the first embodiment.
Figure 6:
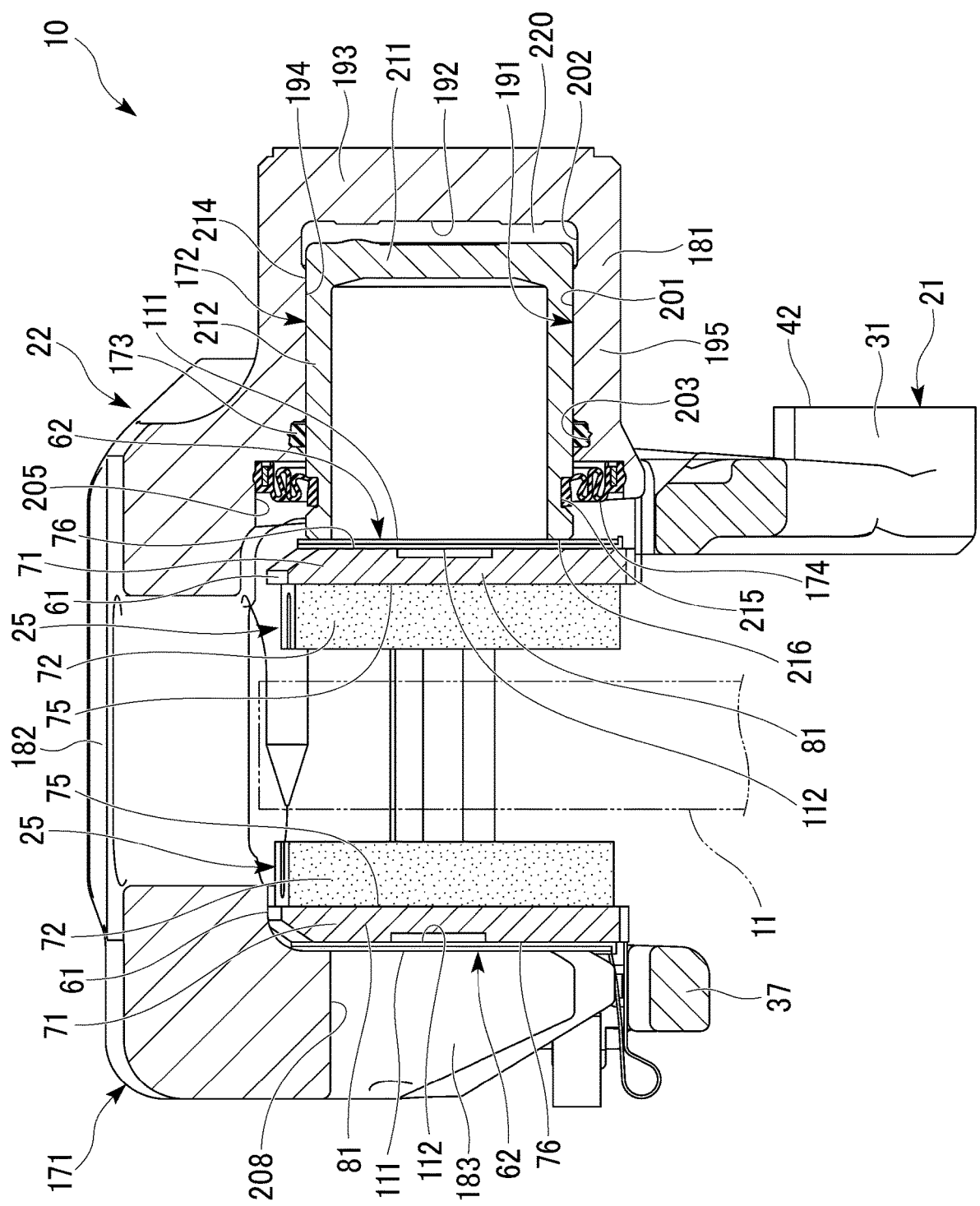
FIG. 6 is a cross-sectional view illustrating the disc brake of the first embodiment.

The pair of friction pad assemblies 25 illustrated in FIGS. 2 and 3 are common components. As illustrated in FIGS. 4 and 5, each of the friction pad assemblies 25 has a friction pad 61 and a laminated shim 62. The friction pad 61 has a metal rear plate 71 and a lining 72 (friction material). As illustrated in FIG. 6, the lining 72 is provided in a manner of being in contact with a surface portion 75 on one side in a plate thickness direction of the rear plate 71. Specifically, the lining 72 is bonded to this surface portion 75. The laminated shim 62 is provided in a surface portion 76 on a side opposite to the lining 72 in the plate thickness direction of the rear plate 71.

As illustrated in FIGS. 2 and 3, the pair of friction pad assemblies 25 are supported by the attachment member 21 with the pad springs 26 therebetween in the rear plate 71. At this time, as illustrated in FIG. 6, each of the pair of friction pad assemblies 25 faces the disc 11 with the lining 72 therebetween. Thus, in the friction pad assemblies 25, the lining 72 comes into contact with the disc 11. In the rear plate 71, the surface portion 75 faces the disc 11 side in the disc axial direction, and the surface portion 76 faces a side opposite to the disc 11.

As illustrated in FIG. 5, the rear plate 71 has a main plate portion 81 to which the lining 72 is bonded, and a projection portion 82 protruding outward in a longitudinal direction of the main plate portion 81 from both end portions of the main plate portion 81 in the longitudinal direction.

As illustrated in FIG. 2, in the friction pad assembly 25 on the inner side, one projection portion 82 of the rear plate 71 of the friction pad 61 thereof is disposed inside the pad guide portion 48 of one inner side torque receiving portion 32 with the guide portion 51 of the corresponding pad spring 26 therebetween. The other projection portion 82 of the rear plate 71 of the friction pad 61 is disposed inside the pad guide portion 48 of the other inner side torque receiving portion 32 with the guide portion 51 of the corresponding pad spring 26 therebetween. Accordingly, the friction pad assembly 25 on the inner side is supported by the attachment member 21 in a manner of being able to move in the disc axial direction.

In the friction pad assembly 25 on the inner side, the projection portions 82 on both sides of the rear plate 71 of the friction pad 61 thereof are pressed outward in the disc radial direction by the radial direction biasing portions 52 of the pad springs 26 which they respectively abut. In addition, in the friction pad assembly 25 on the inner side, the main plate portion 81 of the rear plate 71 of the friction pad 61 thereof is biased to the central side in the disc rotation direction by the rotation direction biasing portions 53 of the pad springs 26 which they respectively abut.

As illustrated in FIG. 3, in the friction pad assembly 25 on the outer side, one projection portion 82 of the rear plate 71 of the friction pad 61 thereof is disposed inside the pad guide portion 48 of one outer side torque receiving portion 36 with the guide portion 51 of the corresponding pad spring 26 therebetween. The other projection portion 82 of the rear plate 71 of the friction pad 61 is disposed inside the pad guide portion 48 of the other outer side torque receiving portion 36 with the guide portion 51 of the corresponding pad spring 26 therebetween. Accordingly, the friction pad assembly 25 on the outer side is supported by the attachment member 21 in a manner of being able to move in the disc axial direction.

In the friction pad assembly 25 on the outer side, the projection portions 82 on both sides of the rear plate 71 of the friction pad 61 thereof are pressed outward in the disc radial direction by the radial direction biasing portions 52 of the pad springs 26 which they respectively abut. In addition, in the friction pad assembly 25 on the outer side, the main plate portion 81 of the rear plate 71 of the friction pad 61 thereof is biased to the central side in the disc rotation direction by the rotation direction biasing portions 53 of the pad springs 26 which they respectively abut.

As illustrated in FIG. 5, the rear plate 71 has a mirror-symmetrical shape with respect to the center in the disc rotation direction. The rear plate 71 has a pair of end edge protrusion portions 84, a pair of spring attachment projection portions 85, a pair of sensor attachment projection portions 86, and a pair of positioning projection portions 87 on the surface portion 76 side. All of these lie in a thickness direction of the rear plate 71, that is, in the disc axial direction.

The pair of end edge protrusion portions 84 are provided in the projection portions 82 on both sides. The pair of end edge protrusion portions 84 protrude to a side opposite to the lining 72 in the disc axial direction from the projection portions 82 on both sides. The pair of end edge protrusion portions 84 are provided in respective end edge portions of the projection portions 82 on both sides on a side opposite to the main plate portion 81. The pair of spring attachment projection portions 85 are provided on the main plate portion 81 side from the respective end edge protrusion portions 84 of the projection portions 82 on both sides. The pair of spring attachment projection portions 85 protrude to a side opposite to the lining 72 in the disc axial direction from the projection portions 82 on both sides. The pair of sensor attachment projection portions 86 are provided in the main plate portion 81 in a manner of being separated in the disc rotation direction. The pair of sensor attachment projection portions 86 protrude to a side opposite to the lining 72 in the disc axial direction from the main plate portion 81. The pair of positioning projection portions 87 are also provided in the main plate portion 81 in a manner of being separated in the disc rotation direction. The pair of positioning projection portions 87 protrude to a side opposite to the lining 72 in the disc axial direction from the main plate portion 81. The pair of positioning projection portions 87 are disposed between the pair of sensor attachment projection portions 86 in the disc rotation direction.

The surface portion 76 on a side opposite to the lining 72 in the plate thickness direction of the rear plate 71 has a flat surface portion 91 (largest flat surface portion) expanding in a flat surface shape across the main plate portion 81 and the main plate portion 81 sides of the projection portions 82 on both sides. This flat surface portion 91 is one continuously flat surface having the largest area in the surface portion 76. The flat surface portion 91 expands in the plate thickness direction of the rear plate 71, in other words, in a manner of being orthogonal to the disc axial direction. The pair of end edge protrusion portions 84, the pair of spring attachment projection portions 85, the pair of sensor attachment projection portions 86, and the pair of positioning projection portions 87 perpendicularly protrude from this flat surface portion 91.

The pair of spring attachment projection portions 85 have shapes in which the length in the disc radial direction is longer than the length in the disc rotation direction. Both the pair of sensor attachment projection portions 86 and the pair of positioning projection portions 87 have columnar shapes perpendicular to the flat surface portion 91.

An outer circumferential surface 92 of the main plate portion 81 has a radial direction outer end surface 93 that is an end on a side outward in the disc radial direction. This radial direction outer end surface 93 forms a part of the shape of a cylinder surface centering on the center of the disc 11. The radial direction outer end surface 93 and the flat surface portion 91 are connected to each other through a chamfer 94. The chamfer 94 constitutes the surface portion 76. On the outer circumferential surface 92 of the main plate portion 81, an outward recess surface 95 recessed inward in the disc radial direction beyond the radial direction outer end surface 93 is formed at the center in the disc rotation direction on a side outward in the disc radial direction.

The outer circumferential surface 92 of the main plate portion 81 has a radial direction inner end surface 101 that is an end on a side inward in the disc radial direction. The radial direction inner end surface 101 is formed in a shape along the disc axial direction and along the disc rotation direction. On the outer circumferential surface 92 of the main plate portion 81, a pair of inner side recessed surfaces 102 recessed outward in the disc radial direction beyond the radial direction inner end surface 101 and a pair of recessed engagement surfaces 103 recessed outward in the disc radial direction beyond the radial direction inner end surface 101 are formed on a side inward in the disc radial direction. The pair of inner side recessed surfaces 102 are disposed between the pair of recessed engagement surfaces 103 in the disc rotation direction.

The laminated shim 62 has an outer shim 111 (first shim) and an inner shim 112 (second shim). The outer shim 111 and the inner shim 112 are constituted of metal plates or plate materials configured by forming elastic films on metal plates.

Figure 7:
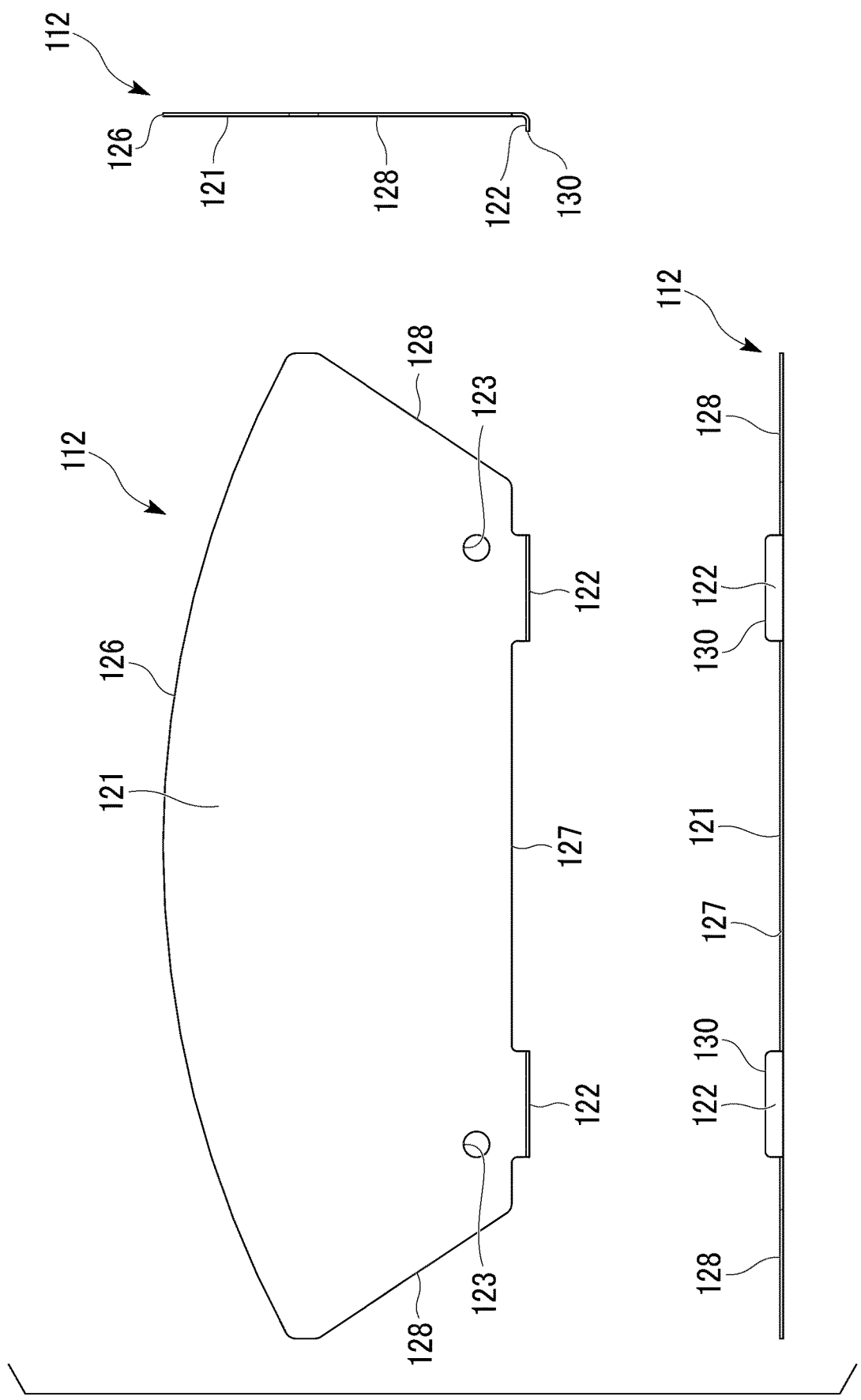
FIG. 7 is a third angle projection diagrams illustrating an inner shim of the disc brake of the first embodiment.

As illustrated in FIG. 7, the inner shim 112 has a flat plate portion 121 (second flat plate portion) expanding in a flat surface shape and a pair of bent portions 122 curved from outer edge sides of the flat plate portion 121 and protruding in a direction perpendicular to the flat plate portion 121. The pair of bent portions 122 are disposed in the same plane in the disc rotation direction and protrude from the flat plate portion 121 to the same side in the plate thickness direction of the flat plate portion 121. In the flat plate portion 121, a positioning hole 123 (round hole) is formed in the vicinity of each of the pair of bent portions 122 in a manner of penetrating the flat plate portion 121 in the plate thickness direction.

Figure 8:
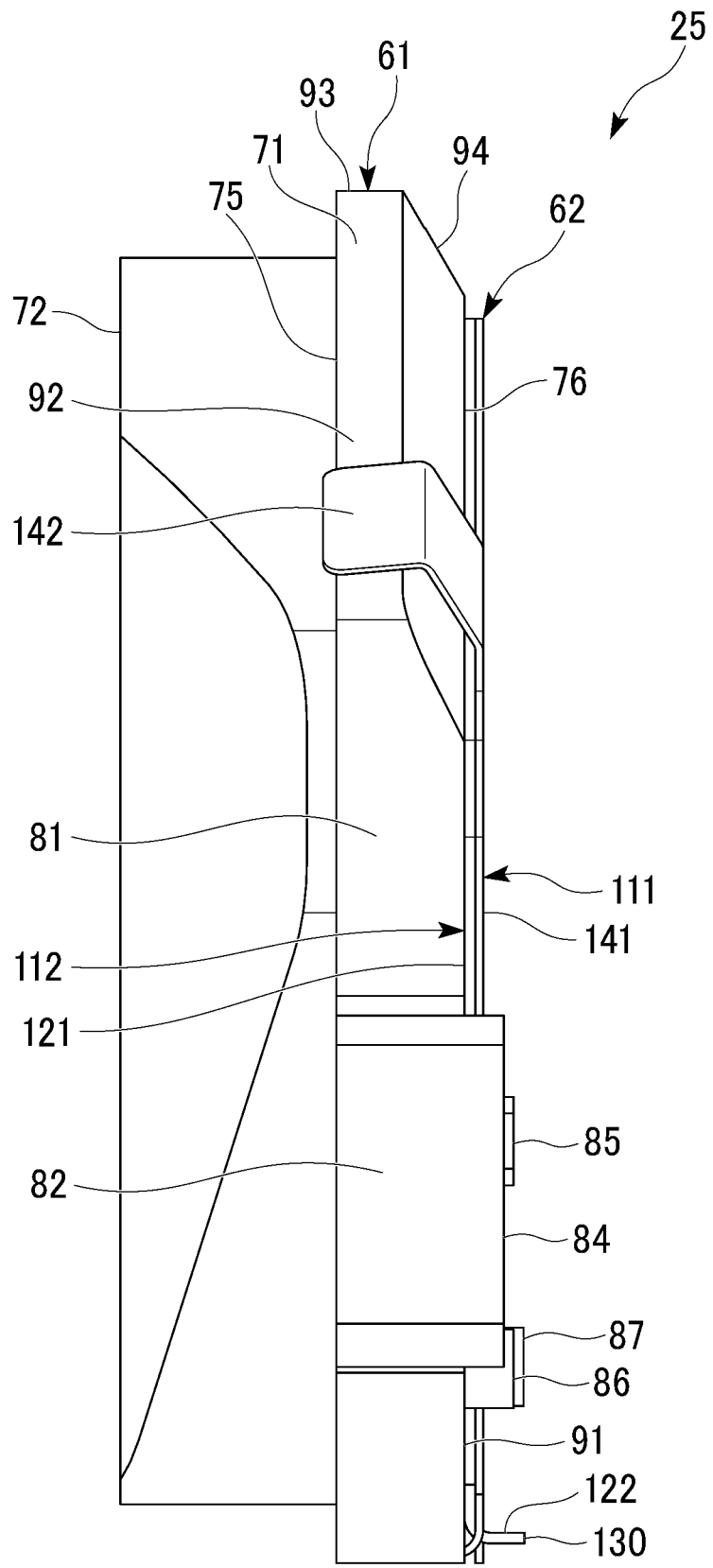
FIG. 8 is a side view illustrating the friction pad assembly of the disc brake of the first embodiment in a normal assembly state.
Figure 9:
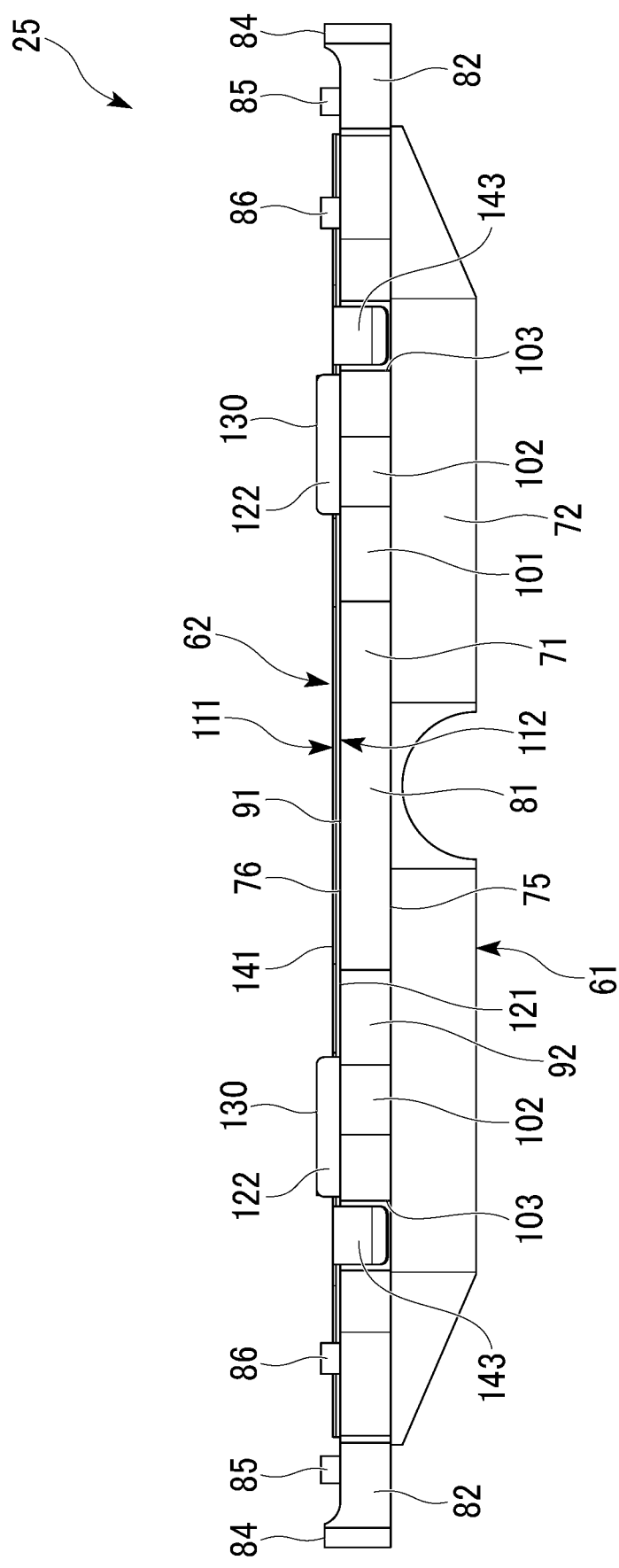
FIG. 9 is a bottom view illustrating the friction pad assembly of the disc brake of the first embodiment in a normal assembly state.

As illustrated in FIG. 5, in the inner shim 112, in a direction in which the pair of bent portions 122 protrude to a side opposite to the friction pad 61 from the flat plate portion 121, one of the pair of positioning holes 123 is fitted to corresponding one of the pair of positioning projection portions 87, and the other of the pair of positioning holes 123 is fitted to the other corresponding one of the pair of positioning projection portions 87. Consequently, as illustrated in FIGS. 8 and 9, the flat plate portion 121 abuts the flat surface portion 91 of the rear plate 71 in a surface contact manner.

When the pair of positioning holes 123 are fitted to the pair of positioning projection portions 87, the inner shim 112 is subjected to positioning in all directions orthogonal to the disc axial direction with respect to the rear plate 71 which the inner shim 112 abuts in a surface contact manner. As a result, relative movement of the inner shim 112 with respect to the rear plate 71 on a plane parallel to the flat plate portion 121 is restricted. In other words, relative movement of the inner shim 112 with respect to the rear plate 71 on a plane parallel to the flat surface portion 91 is restricted. In the inner shim 112, a part for curbing movement in a direction in which the inner shim 112 is separated from the friction pad 61 in the plate thickness direction of the friction pad 61, for example, a part such as a claw portion is not formed.

As illustrated in FIG. 7, the inner shim 112 has a mirror-symmetrical shape with respect to the center in the disc rotation direction. In the flat plate portion 121, an outer edge portion 126 on a side outward in the disc radial direction has an arc shape centering on the center of the disc 11. An outer edge portion 127 on a side inward in the disc radial direction has substantially a linear shape in the disc rotation direction. The pair of bent portions 122 protrude from this outer edge portion 127 on a side inward in the disc radial direction. Thus, the pair of bent portions 122 of the inner shim 112 are formed in the outer edge portion 127 on a side inward in the disc radial direction in the flat plate portion 121. In the inner shim 112, outer edge portions 128 on both sides in the disc rotation direction have linear shapes in the disc radial direction.

Figure 10:
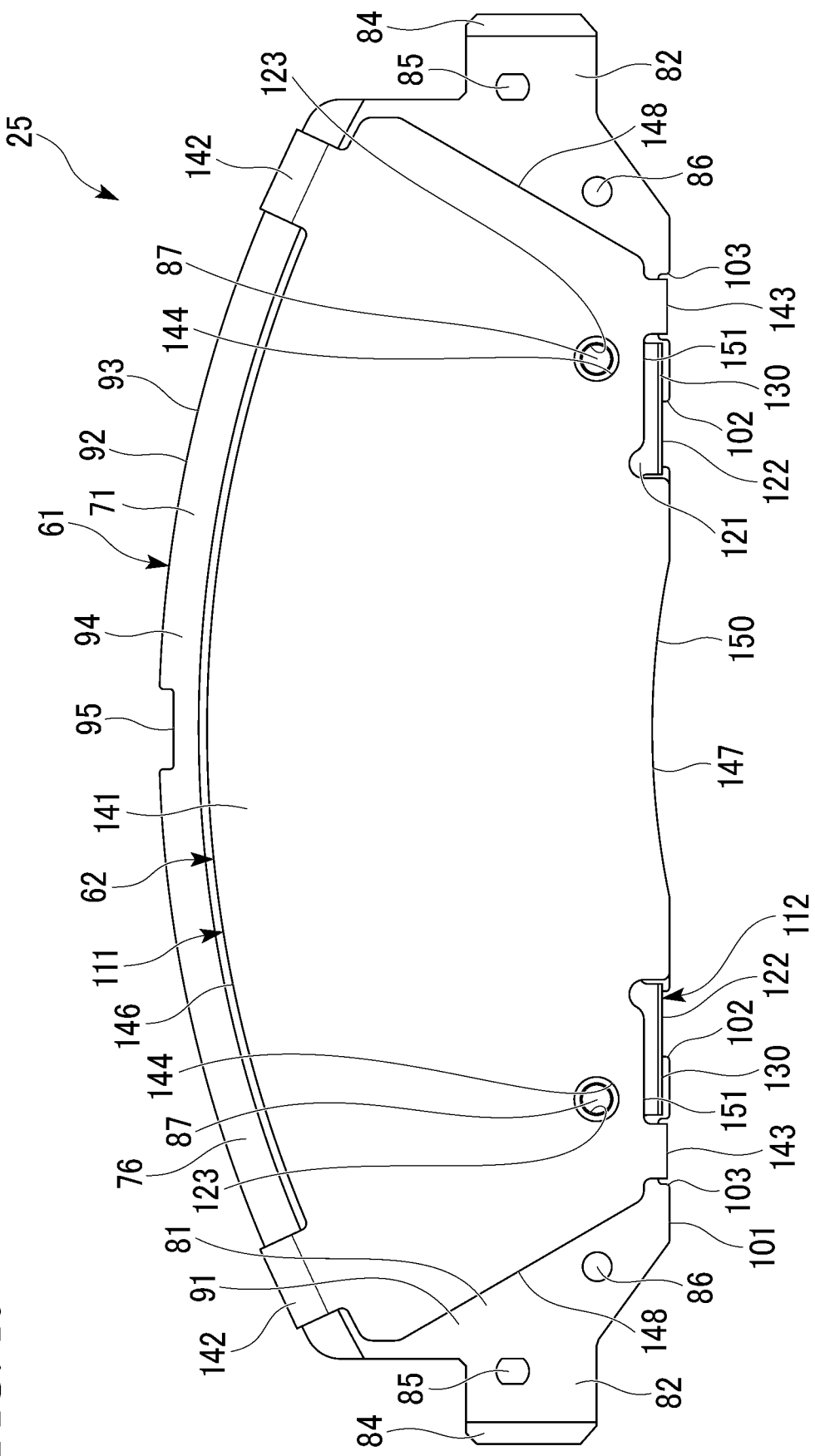
FIG. 10 is a rear view illustrating the friction pad assembly of the disc brake of the first embodiment in a normal assembly state.

As illustrated in FIG. 10, when the pair of positioning holes 123 are fitted to the pair of positioning projection portions 87, the inner shim 112 is subjected to positioning in all directions orthogonal to the disc axial direction with respect to the rear plate 71. In this state, a part of each of the pair of bent portions 122 is disposed within a projection plane in the disc axial direction of the flat surface portion 91 of the rear plate 71. Specifically, in the pair of bent portions 122, the entireties including leading end portions 130 in parts on opposing sides in the disc rotation direction are disposed within a projection plane in the disc axial direction of the flat surface portion 91 of the rear plate 71.

Thus, in the inner shim 112, even if the positions of the pair of positioning holes 123 are aligned with the pair of positioning projection portions 87 and these are fitted to each other in a direction in which the pair of bent portions 122 face the rear plate 71 side, the pair of bent portions 122 abut the flat surface portion 91, and thus surface contact of the flat plate portion 121 with the flat surface portion 91 is restricted. In the pair of bent portions 122, at least parts of the leading end portions 130 need only be disposed within a projection plane in the disc axial direction of the flat surface portion 91 of the rear plate 71.

Figure 11:
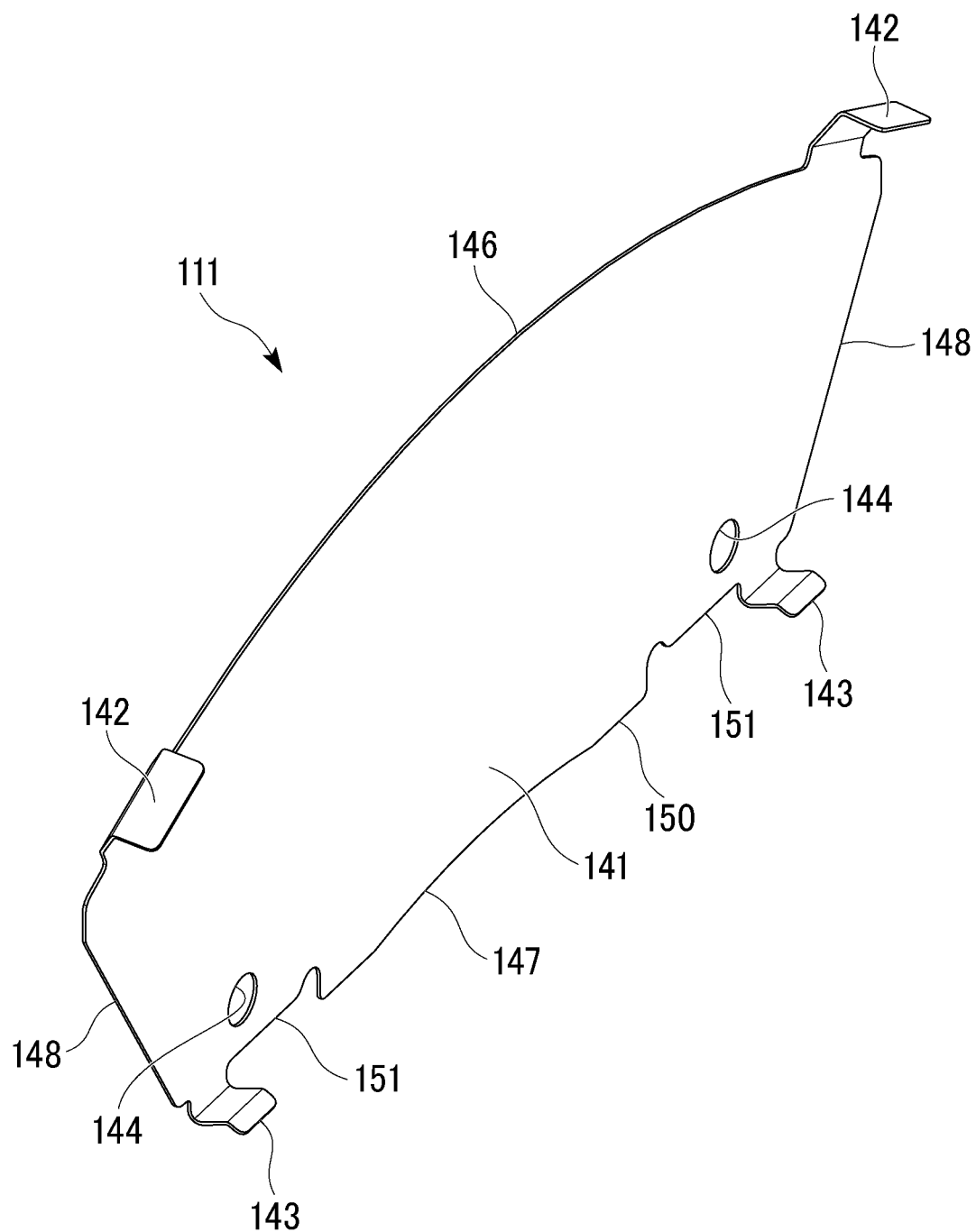
FIG. 11 is a perspective view illustrating an outer shim of the disc brake of the first embodiment.
Figure 12:
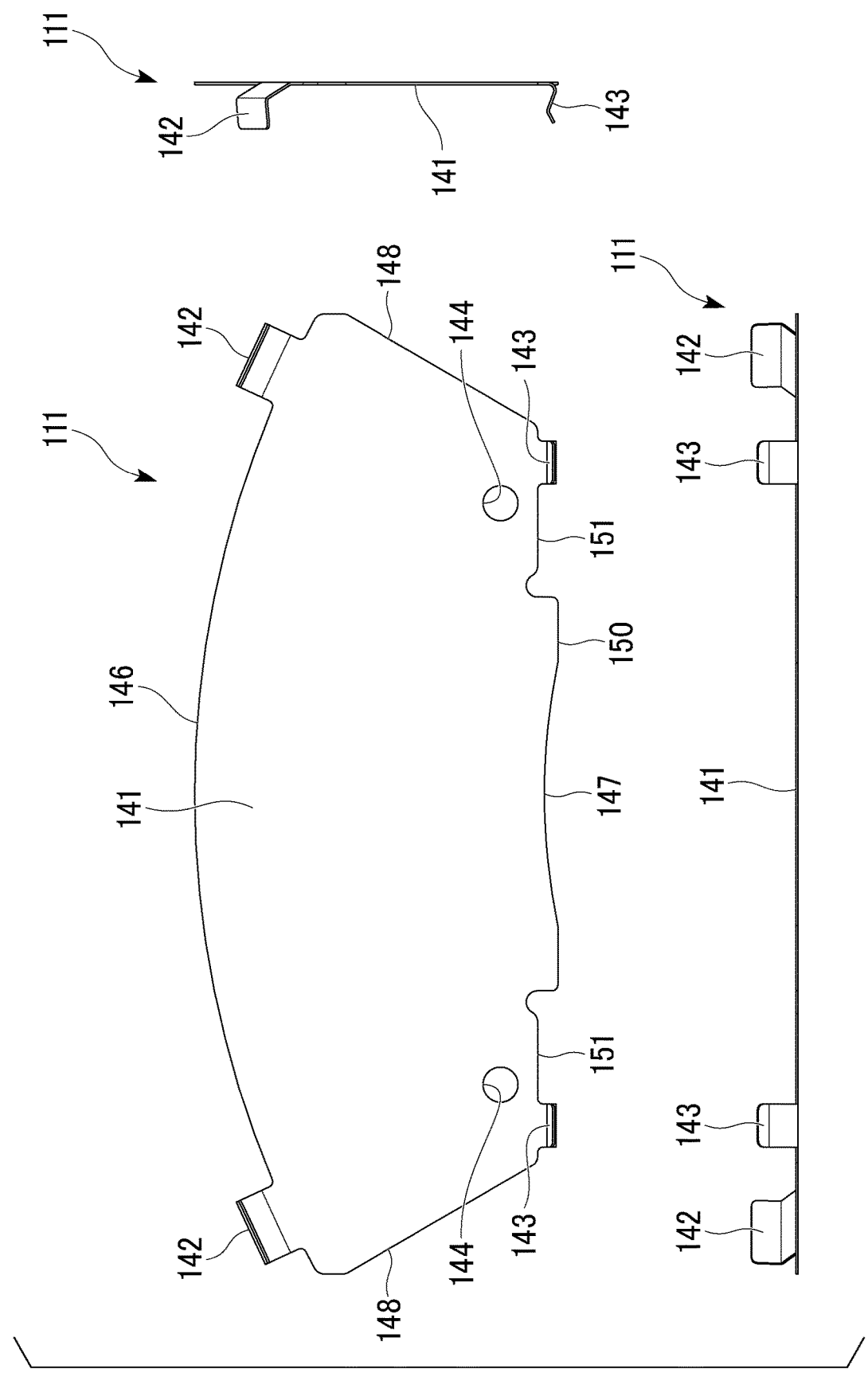
FIG. 12 is a third angle projection diagrams illustrating the outer shim of the disc brake of the first embodiment.

As illustrated in FIGS. 11 and 12, the outer shim 111 has a flat plate portion 141 (first flat plate portion) expanding in a flat surface shape, a pair of claw portions 142 curved from an outer edge side of the flat plate portion 141 and protruding in a direction perpendicular to the flat plate portion 141, and a pair of claw portions 143 curved from the outer edge side of the flat plate portion 141 and protruding in a direction perpendicular to the flat plate portion 141. The pair of claw portions 142 and the pair of claw portions 143 protrude from the flat plate portion 141 to the same side in the plate thickness direction of the flat plate portion 141. In the flat plate portion 141, an insertion hole 144 (round hole) is formed in the vicinity of each of the pair of claw portions 143 in a manner of penetrating the flat plate portion 141 in the plate thickness direction. As illustrated in FIG. 10, the pair of insertion holes 144 are formed at a pitch equal to that of the pair of positioning holes 123. The insertion holes 144 has a larger diameter than the positioning hole 123.

In the outer shim 111, as illustrated in FIG. 5, the pair of claw portions 142 and the pair of claw portions 143 are directed in a manner of protruding from the flat plate portion 141 to the friction pad 61 side. As illustrated in FIG. 4, the pair of claw portions 142 are engaged with the radial direction outer end surface 93 of the rear plate 71. As illustrated in FIG. 9, the pair of claw portions 143 are engaged with the pair of recessed engagement surfaces 103 of the rear plate 71, and as illustrated in FIG. 4, the pair of positioning projection portions 87 are inserted into the pair of insertion holes 144. Accordingly, as illustrated in FIGS. 8 and 9, the flat plate portion 141 abut the flat plate portion 121 of the inner shim 112 in a surface contact manner. The pair of claw portions 142 and the pair of claw portions 143 sandwich the rear plate 71 therebetween from both sides in the disc radial direction due to elastic forces.

Accordingly, the outer shim 111 is subjected to positioning in all directions orthogonal to the disc axial direction with respect to the rear plate 71 which the outer shim 111 abuts with the inner shim 112 therebetween. As a result, relative movement of the outer shim 111 with respect to the inner shim 112 and the rear plate 71 on a plane parallel to the flat plate portion 141 is restricted. In other words, relative movement of the outer shim 111 with respect to the inner shim 112 and the rear plate 71 on a plane parallel to the flat surface portion 91 is restricted.

Furthermore, movement of the outer shim 111 in a direction in which the outer shim 111 is separated from the friction pad 61 in the plate thickness direction of the friction pad 61 is curbed due to elastic forces of the pair of claw portions 142 and the pair of claw portions 143. As a result, the inner shim 112 is also pressed by the outer shim 111, and thus movement in a direction in which the inner shim 112 is separated from the friction pad 61 in the plate thickness direction of the friction pad 61 is curbed. That is, the rear plate 71, the inner shim 112, and the outer shim 111 are integrated.

As illustrated in FIG. 12, the outer shim 111 has a mirror-symmetrical shape with respect to the center in the disc rotation direction. In the flat plate portion 141, an outer edge portion 146 on a side outward in the disc radial direction has an arc shape centering on the center of the disc 11. An outer edge portion 147 on a side inward in the disc radial direction has substantially a linear shape in the disc rotation direction. The pair of claw portions 142 protrude from the outer edge portion 146 on a side outward in the disc radial direction. The pair of claw portions 143 protrude from the outer edge portion 147 on a side inward in the disc radial direction.

Thus, the pair of claw portions 142 of the outer shim 111 are formed in the outer edge portion 146 on a side outward in the disc radial direction in the flat plate portion 141. In addition, the pair of claw portions 143 of the outer shim 111 are formed in the outer edge portion 147 on a side inward in the disc radial direction in the flat plate portion 141. In the outer shim 111, outer edge portions 148 on both sides in the disc rotation direction have linear shapes in the disc radial direction.

The outer edge portion 147 on a side inward in the disc radial direction in the flat plate portion 141 has a pair of recessed shape portions 151 on a side inward from the pair of claw portions 143 in the disc rotation direction. The recessed shape portions 151 have shapes recessed outward in the disc radial direction from positions that are base ends of the claw portions 143 of the outer edge portion 147 and an intermediate portion 150 of the outer edge portion 147 in the disc rotation direction.

As illustrated in FIG. 10, the entirety of one bent portion 122 of the inner shim 112 is disposed inside one recessed shape portion 151. The entirety of the other bent portion 122 of the inner shim 112 is disposed inside the other recessed shape portion 151. The pair of claw portions 143 of the outer shim 111 is formed on a side opposite to the center of the friction pad 61 in the disc rotation direction from the pair of bent portions 122 of the inner shim 112. As illustrated in FIG. 9, the pair of bent portions 122 protrude to a side opposite to the rear plate 71 from the flat plate portion 141 of the outer shim 111.

As illustrated in FIG. 10, when the pair of positioning projection portions 87 are inserted into the pair of insertion holes 144 and the pair of claw portions 142 and the pair of claw portions 143 are engaged with the rear plate 71, the outer shim 111 is subjected to positioning in all directions orthogonal to the disc axial direction with respect to the rear plate 71. In this state, in the outer shim 111, the pair of recessed shape portions 151 are disposed within a projection plane in the disc axial direction of the flat surface portion 91 of the rear plate 71. In this state, the outer shim 111 is in a state of being subjected to positioning in all directions orthogonal to the disc axial direction with respect to the inner shim 112 as well.

As described above, the laminated shim 62 includes the flat plate portion 141, the outer shim 111 having the pair of claw portions 142 and the pair of claw portions 143 curved from the outer edge side of the flat plate portion 141 and attached to the outer circumferential surface 92 of the rear plate 71, the flat plate portion 121 disposed in a manner of being sandwiched between the flat plate portion 141 of the outer shim 111 and the rear plate 71, and the inner shim 112 having the pair of bent portions 122 curved from an outer edge side of the flat plate portion 121 to the flat plate portion 141 side. Further, relative movement of the inner shim 112 with respect to the outer shim 111 and the rear plate 71 on a plane parallel to the flat plate portion 121 is restricted.

In the friction pad assembly 25 on the inner side of the pair of friction pad assemblies 25, as illustrated in FIG. 2, the pair of projection portions 82 are inserted into the guide portions 51 of the pair of pad springs 26 attached to the pair of inner side torque receiving portions 32. At this time, the rear plate 71 causes elastic deformation of the radial direction biasing portion 52 on both sides in the disc rotation direction and the rotation direction biasing portion 53 on both sides in the disc rotation direction. The friction pad assembly 25 on the inner side attached to the attachment member 21 with the pair of pad springs 26 therebetween in this manner is positioned on one surface side of the disc 11 and can move in the disc axial direction with respect to the attachment member 21. Each of the pad springs 26 is attached to the attachment member 21 and elastically supports the corresponding friction pad assembly 25.

The pair of projection portions 82 of the friction pad assembly 25 on the inner side are disposed in nest shapes with the guide portions 51 of the pair of pad springs 26 therebetween in the recessed pad guide portions 48 of the pair of inner side torque receiving portions 32. Thus, the pad guide portions 48 of the inner side torque receiving portions 32 restrict movement of the pair of projection portions 82 of the friction pad assembly 25 on the inner side in the disc radial direction. In addition, the pad guide portions 48 of the inner side torque receiving portions 32 receive a braking torque in the disc rotation direction from the projection portions 82 of the friction pad assembly 25 on the inner side via the guide portion 51.

In the friction pad assembly 25 on the outer side of the pair of friction pad assemblies 25, as illustrated in FIG. 3, the pair of projection portions 82 are inserted into the guide portions 51 of the pair of pad springs 26 attached to the pair of outer side torque receiving portions 36. At this time, the rear plate 71 causes elastic deformation of the radial direction biasing portion 52 on both sides in the disc rotation direction and the rotation direction biasing portion 53 on both sides in the disc rotation direction. The friction pad assembly 25 on the outer side attached to the attachment member 21 with the pair of pad springs 26 therebetween in this manner is positioned on the other surface side of the disc 11 and can move in the disc axial direction with respect to the attachment member 21. Each of the pad springs 26 is attached to the attachment member 21 and elastically supports the corresponding friction pad assembly 25.

The pair of projection portions 82 of the friction pad assembly 25 on the outer side are disposed in nest shapes with the guide portions 51 of the pair of pad springs 26 therebetween in the recessed pad guide portions 48 of the pair of outer side torque receiving portions 36. Thus, the pad guide portions 48 of the outer side torque receiving portions 36 restrict movement of the pair of projection portions 82 of the friction pad assembly 25 on the outer side in the disc radial direction. In addition, the pad guide portions 48 of the outer side torque receiving portions 36 receive a braking torque in the disc rotation direction from the projection portions 82 of the friction pad assembly 25 on the outer side via the guide portion 51.

As described above, in the attachment member 21, as illustrated in FIG. 2, the inner side torque receiving portions 32 are respectively formed on one side in the disc rotation direction and on the other side in the disc rotation direction such that they bear a braking torque of the friction pad assembly 25 on the inner side. In addition, in the attachment member 21, as illustrated in FIG. 3, the outer side torque receiving portions 36 are respectively formed on one side in the disc rotation direction and on the other side in the disc rotation direction such that they bear a braking torque of the friction pad assembly 25 on the outer side.

As illustrated in FIG. 2, in the friction pad assembly 25 on the inner side, spring members 161 are respectively attached to both sides in the disc rotation direction. Each of the spring members 161 abuts corresponding one of the pair of inner side torque receiving portions 32 and biases the friction pad assembly 25 on the inner side in a direction in which it is separated from the disc 11. One spring member 161 is attached to the spring attachment projection portion 85 on one side in the disc rotation direction by swaging this spring attachment projection portion 85. The other spring member 161 is attached to the spring attachment projection portion 85 on the other side in the disc rotation direction by swaging this spring attachment projection portion 85. In addition, in the friction pad assembly 25 on the inner side, an abrasion sensor 162 is attached to the sensor attachment projection portion 86 on one side in the disc rotation direction by swaging this sensor attachment projection portion 86.

As illustrated in FIG. 3, also in the friction pad assembly 25 on the outer side, the spring members 161 are respectively attached to both sides in the disc rotation direction. Each of the spring members 161 abuts corresponding one of the pair of outer side torque receiving portions 36 and biases the friction pad assembly 25 on the outer side in a direction in which it is separated from the disc 11. One spring member 161 is attached to the spring attachment projection portion 85 on one side in the disc rotation direction by swaging this spring attachment projection portion 85. The other spring member 161 is attached to the spring attachment projection portion 85 on the other side in the disc rotation direction by swaging this spring attachment projection portion 85.

As illustrated in FIG. 1, the caliper 22 substantially has a mirror-symmetrical shape. As illustrated in FIG. 6, the caliper 22 includes a caliper body 171, a piston 172, a piston seal 173, and a piston boot 174.

The caliper body 171 is integrally formed by casting. The caliper body 171 has a cylinder portion 181 disposed on the inner side in the disc axial direction with respect to the disc 11, a bridge portion 182 extending outward in the disc axial direction such that it straddles the outer circumference of the disc 11 from a side outward in the disc radial direction in the cylinder portion 181, a pressing claw 183 extending inward in the disc radial direction from a side of the bridge portion 182 opposite to the cylinder portion 181 and disposed on the outer side in the disc axial direction in the disc 11, and a pair of pin attachment portions 184 extending from the cylinder portion 181 to both sides in the disc rotation direction as illustrated in FIG. 1.

In the caliper body 171, the slide pins 45 are attached to the pin attachment portions 184 on one side in the disc rotation direction. The slide pins 45 are also attached to the pin attachment portions 184 on the other side in the disc rotation direction. The pair of slide pins 45 on both sides of the caliper 22 (illustrated in FIG. 1) in the disc rotation direction are fitted into the pair of pin insertion holes 43 (illustrated in FIG. 2) in a slidable manner. Each of the pair of boots 23 covers a part protruding from the attachment member 21 of the corresponding slide pin 45.

As illustrated in FIG. 6, in the cylinder portion 181, cylinder bores 191 are formed in which one end opens toward the pressing claw 183 side and recessed toward a side opposite to the disc 11 in the disc axial direction. A plurality of (specifically, two) cylinder bores 191 are provided in the cylinder portion 181. The cylinder bores 191 have the same shapes. Positions of the cylinder bores 191 in the disc axial direction and the disc radial direction are aligned, and positions thereof in the disc rotation direction are not aligned. In other words, the cylinder bores 191 are provided in the cylinder portion 181 at two places side by side in the disc rotation direction.

The cylinder portion 181 has a cylinder bottom portion 193 including inner bottom surfaces 192 of the plurality of cylinder bores 191 on a side opposite to the pressing claw 183. In addition, the cylinder portion 181 has a cylinder body portion 195 extending from the cylinder bottom portion 193 to the pressing claw 183 side and including wall surfaces 194 of the plurality of cylinder bores 191.

The piston 172 is disposed in each of the plurality of cylinder bores 191 in a movable manner in the disc axial direction. Each of the wall surfaces 194 of the cylinder bores 191 has a guide inner circumferential surface 201 that is a cylinder surface for guiding movement of the piston 172. Each of the wall surfaces 194 of the cylinder bores 191 has an annular large diameter groove 202 recessed outward in the radial direction beyond the guide inner circumferential surface 201 on the cylinder bottom portion 193 side of the guide inner circumferential surface 201. Each of the wall surfaces 194 of the cylinder bores 191 has an annular piston seal groove 203 recessed outward in the radial direction beyond the guide inner circumferential surface 201 at an intermediate position on a side opposite to the cylinder bottom portion 193 of the guide inner circumferential surface 201.

In the cylinder portion 181, an annular boot fitting hole 205 recessed outward in the radial direction beyond the guide inner circumferential surface 201 of the cylinder bore 191 is formed on the pressing claw 183 side of the cylinder bores 191. Each of the cylinder bores 191 is open at a bottom portion of the boot fitting hole 205.

As illustrated in FIG. 3, a plurality of (specifically, two) recesses 208 recessed outward in the disc radial direction from an end edge portion on a side inward in the disc radial direction are provided in the pressing claw 183. These recesses 208 have the same shapes. Positions of the recesses 208 in the disc axial direction and the disc radial direction are aligned, and positions thereof in the disc rotation direction are not aligned. In other words, the recesses 208 are provided in the pressing claw 183 at two places side by side in the disc rotation direction. One recess 208 is a part through which a tool for machining one cylinder bore 191 is inserted. The position of one recess 208 is aligned with that of this cylinder bore 191 in the disc radial direction and the disc rotation direction. The other recess 208 is a part through which a tool for machining the other cylinder bore 191 is inserted. The position of the other recess 208 is aligned with that of this cylinder bore 191 in the disc radial direction and the disc rotation direction.

As illustrated in FIG. 6, the piston 172 includes a disc-shaped piston bottom portion 211 and a cylindrical piston body portion 212. The piston 172 is formed to have a bottomed tubular shape in which an end portion on a side opposite to the piston bottom portion 211 of the piston body portion 212 is open. In the piston body portion 212, an annular engagement groove 215 recessed inward in the radial direction beyond a largest outer diameter surface 214 configured of a cylinder surface is formed on a side opposite to the piston bottom portion 211 in the axial direction thereof.

The piston 172 is accommodated in the cylinder bore 191 in a direction in which the piston bottom portion 211 is positioned on the cylinder bottom portion 193 side inside the cylinder bore 191. In this state, in the piston 172, a leading end on the pressing claw 183 side protrudes to the pressing claw 183 side beyond the cylinder bore 191.

In the piston 172, the engagement groove 215 is formed on the leading end side protruding beyond the cylinder bore 191 in this manner. In the piston 172, a leading end surface 216 on a side opposite to the piston bottom portion 211 of the piston body portion 212 is a flat surface expanding in a direction orthogonal to the axis of the piston 172. The piston 172 abuts the friction pad assembly 25 on the inner side on this leading end surface 216.

The piston seal 173 is fitted into the piston seal groove 203 of the cylinder bore 191. The piston 172 is fitted to the inner circumferential side of the piston seal 173. The piston seal 173 seals a gap between the cylinder portion 181 and the piston 172. The piston seal 173 supports the piston 172 with the guide inner circumferential surface 201 of the cylinder bore 191 in a movable manner in the disc axial direction.

The piston boot 174 has a bellows shape. In the piston boot 174, one end side is fitted into the boot fitting hole 205 of the cylinder portion 181, and the other end side is fitted into the engagement groove 215 of the piston 172. The piston boot 174 covers the outer circumferential portion exposed from the cylinder portion 181 of a part on the cylinder bore 191 side of the engagement groove 215 of the piston 172. The piston boot 174 extends and contracts in accordance with movement of the piston 172 with respect to the cylinder portion 181.

Here, a space formed by the cylinder bottom portion 193, a part of the cylinder body portion 195 on the cylinder bottom portion 193 side, and the piston 172 fitted into the cylinder bore 191 serves as a fluid pressure chamber 220 in which a brake fluid is supplied and discharged through a pipe hole (not illustrated). A plurality of (specifically, two) cylinder bores 191 are provided side by side in the disc rotation direction. As a result, a plurality of (specifically, two) fluid pressure chambers 220 are also provided side by side in the disc rotation direction.

In the friction pad assembly 25 on the inner side illustrated in FIG. 2, the flat plate portion 141 of the outer shim 111 comes into surface contact with the leading end surfaces 216 of both the piston 172. In the friction pad assembly 25 on the inner side, the pair of bent portions 122 of the inner shim 112 and the pair of positioning projection portions 87 of the rear plate 71 are disposed on a side outward from the leading end surfaces 216 of the pair of pistons 172 in a direction orthogonal to the axis of the disc. In other words, in the friction pad assembly 25 on the inner side, the pair of bent portions 122 and the pair of positioning projection portions 87 are disposed outside projection surfaces of the leading end surfaces 216 of the pair of pistons 172 in the disc axial direction. Moreover, in other words, in the friction pad assembly 25 on the inner side, the pair of bent portions 122 and the pair of positioning projection portions 87 are disposed at positions not overlapping the leading end surfaces 216 of the pair of pistons 172 in a direction orthogonal to the axis of the disc. Moreover, in other words, in the friction pad assembly 25 on the inner side, the pair of bent portions 122 and the pair of positioning projection portions 87 are disposed at positions where they do not come into contact with the pair of pistons 172.

In the friction pad assembly 25 on the outer side illustrated in FIG. 3, the flat plate portion 141 of the outer shim 111 comes into surface contact with the pressing claw 183. In the friction pad assembly 25 on the outer side, the pair of bent portions 122 of the inner shim 112 and the pair of positioning projection portions 87 of the rear plate 71 are disposed on a side outward from the pressing claw 183. In other words, in the friction pad assembly 25 on the outer side, the pair of bent portions 122 and the pair of positioning projection portions 87 are disposed outside the projection surface of the pressing claw 183 in the disc axial direction. Moreover, in other words, in the friction pad assembly 25 on the outer side, the pair of bent portions 122 and the pair of positioning projection portions 87 are disposed at positions not overlapping the pressing claw 183 in a direction orthogonal to the axis of the disc. Moreover, in other words, in the friction pad assembly 25 on the outer side, the pair of bent portions 122 and the pair of positioning projection portions 87 are disposed at positions where they do not come into contact with the pressing claw 183.

In the disc brake 10, a brake fluid is introduced to the fluid pressure chambers 220 at two places in the caliper 22 through a brake pipe (not illustrated). Consequently, in each of the fluid pressure chambers 220 at two places, a brake fluid pressure acts on the piston 172 of the caliper 22. As a result, both the pistons 172 move forward to the disc 11 side, and the friction pad assembly 25 on the inner side disposed between the pistons 172 and the disc 11 is pressed toward the disc 11. Accordingly, the friction pad assembly 25 on the inner side moves and comes into contact with the disc 11 in the lining 72. In addition, due to a reaction force from this pressing, the caliper body 171 causes the slide pins 45 to slide with respect to the attachment member 21 and move in the disc axial direction, and the pressing claw 183 presses the friction pad assembly 25 on the outer side disposed between the pressing claw 183 and the disc 11 toward the disc 11. Accordingly, the friction pad assembly 25 on the outer side comes into contact with the disc 11 in the lining 72. In this manner, the caliper 22 sandwiches the pair of friction pad assemblies 25 with the piston 172 and the pressing claw 183 from both sides in accordance with operation of the plurality of pistons 172 and presses the pair of friction pads 61 to both surfaces of the disc 11. As a result, the caliper 22 applies a frictional resistance to the disc 11 and generates a braking force. The caliper 22 is a fist-type caliper.

The friction pad for a disc brake described in Patent Literature 1 has a structure in which a hole is formed in the vicinity of the center of a thin metal plate, a projection is formed in a shim in a manner corresponding thereto, and the projection is inserted into the hole. Using a laminated shim, it is possible to achieve an effect of generating a damping force with respect to vibration of the friction pad and curbing brake noise. However, when a laminated shim is assembled to a friction pad, if front/back inversion of the shim on the friction pad side occurs, there is a possibility that a sufficient damping force will not be able to be obtained and brake noise performance will deteriorate. In the friction pad for a disc brake described in Patent Literature 1, there is no disclosure regarding a structure for restricting front/back inversion of the shim.

In the disc brake 10 and the laminated shim 62 of the first embodiment, the outer shim 111 has the flat plate portion 141 and the claw portions 142 and 143 curved from the outer edge side of the flat plate portion 141 and attached to the outer circumferential surface 92 of the rear plate 71. The inner shim 112 has the flat plate portion 121 disposed in a manner of being sandwiched between the flat plate portion 141 of the outer shim 111 and the rear plate 71, and the bent portion 122 curved from the outer edge side of the flat plate portion 121 to the flat plate portion 141 side. Further, in the inner shim 112, the leading end portions 130 of the bent portion 122 are disposed within a projection plane in the disc axial direction of the flat surface portion 91 of the rear plate 71.

Figure 13:
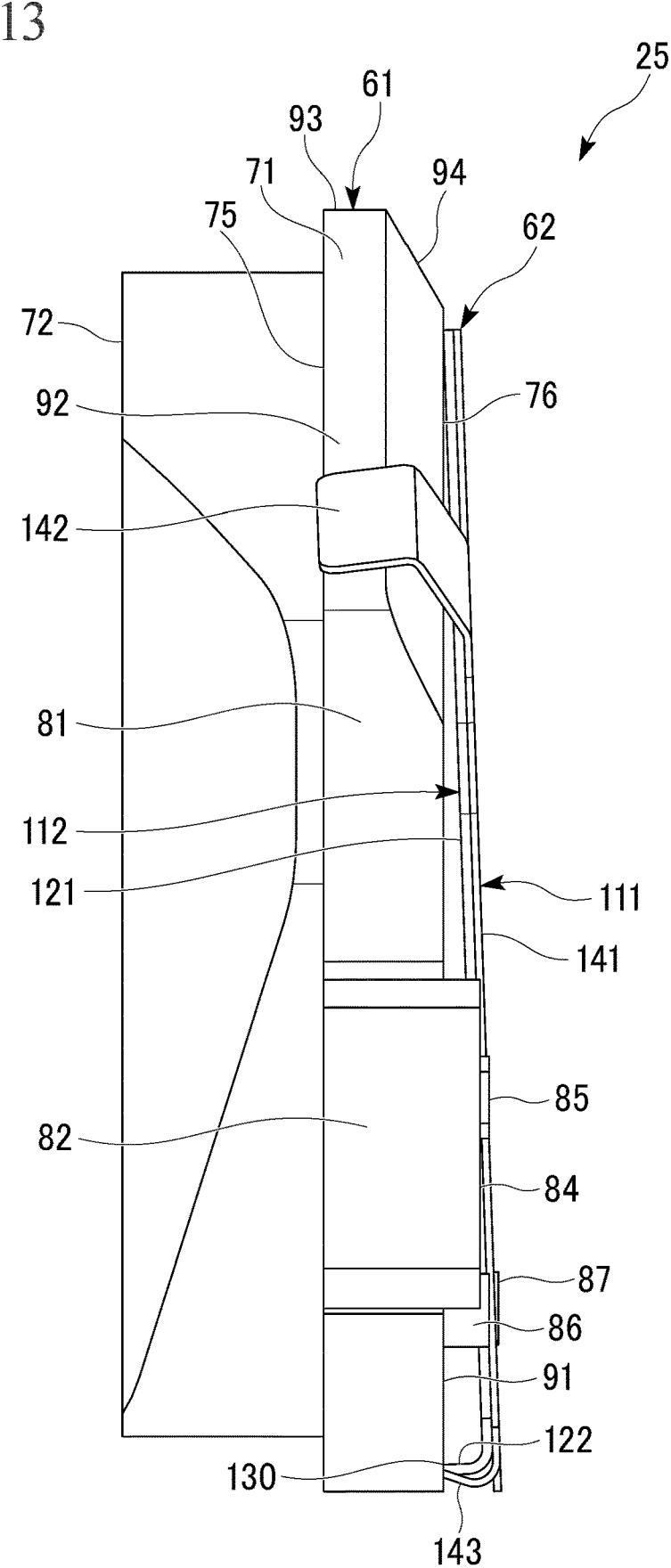
FIG. 13 is a side view illustrating the friction pad assembly of the disc brake of the first embodiment in an erroneous assembly state.
Figure 14:
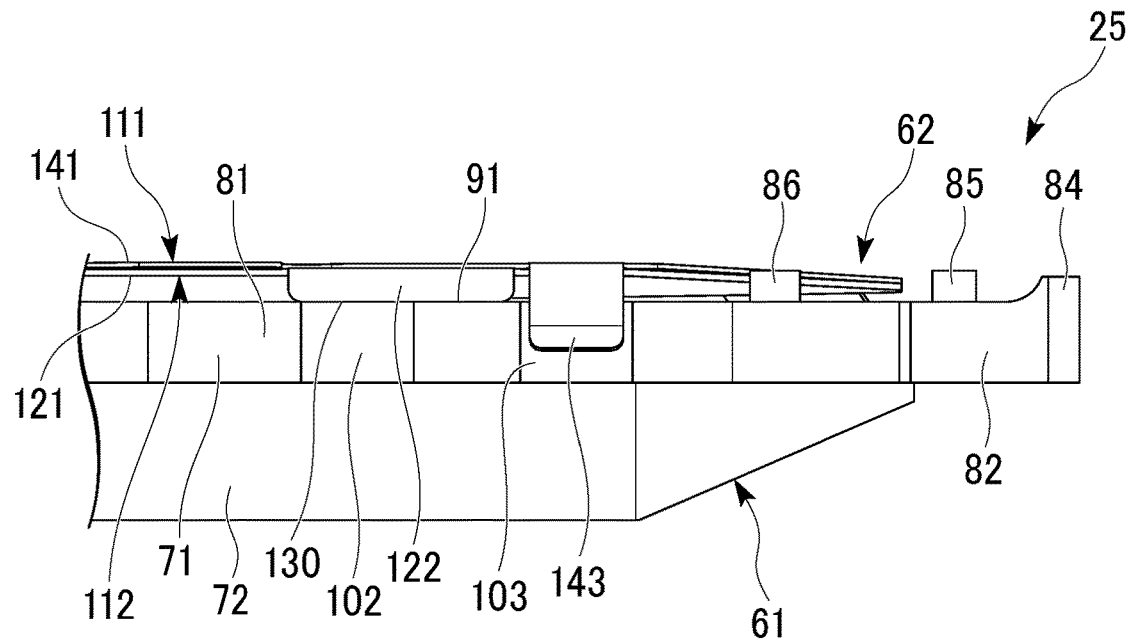
FIG. 14 is a partial bottom view illustrating the friction pad assembly of the disc brake of the first embodiment in an erroneous assembly state.

Thus, as illustrated in FIGS. 13 and 14, on the contrary to the foregoing constitution, if the inner shim 112 is reversely assembled such that it is attached in a direction in which the bent portion 122 is curved from the outer edge side of the flat plate portion 121 to a side opposite to the flat plate portion 141 of the outer shim 111, the leading end portions 130 of the bent portion 122 abut the flat surface portion 91. Consequently, the flat plate portion 121 cannot come into surface contact with the flat surface portion 91 of the rear plate 71 and is in a floating state with a gap with respect to the rear plate 71. Thus, an assembly worker can feel a visual sense of incompatibility and can recognize erroneous assembly in which the inner shim 112 is inside out. Thus, erroneous assembly of the laminated shim 62 constituted of the outer shim 111 and the inner shim 112 can be curbed. For example, even if an assembly worker does not notice such erroneous assembly, a value of dragging of the friction pad 61 with respect to the disc 11 becomes abnormally high, and it will be detected by line inspection, and thus shipment in this state can be prevented.

The claw portions 143 of the outer shim 111 are formed on a side opposite to the center of the friction pad 61 in the disc rotation direction from the bent portion 122 of the inner shim 112. For this reason, the outer shim 111 is stably attached to the friction pad 61.

The bent portion 122 of the inner shim 112 is formed in the outer edge portion 127 on a side inward in the disc radial direction in the flat plate portion 121 of the inner shim 112. For this reason, the bent portion 122 is unlikely to interfere with the piston 172 of the caliper 22 or the pressing claw 183, and a possibility of restricting the degree of freedom in design of the caliper 22 can be reduced.

Second Embodiment

Figure 15:
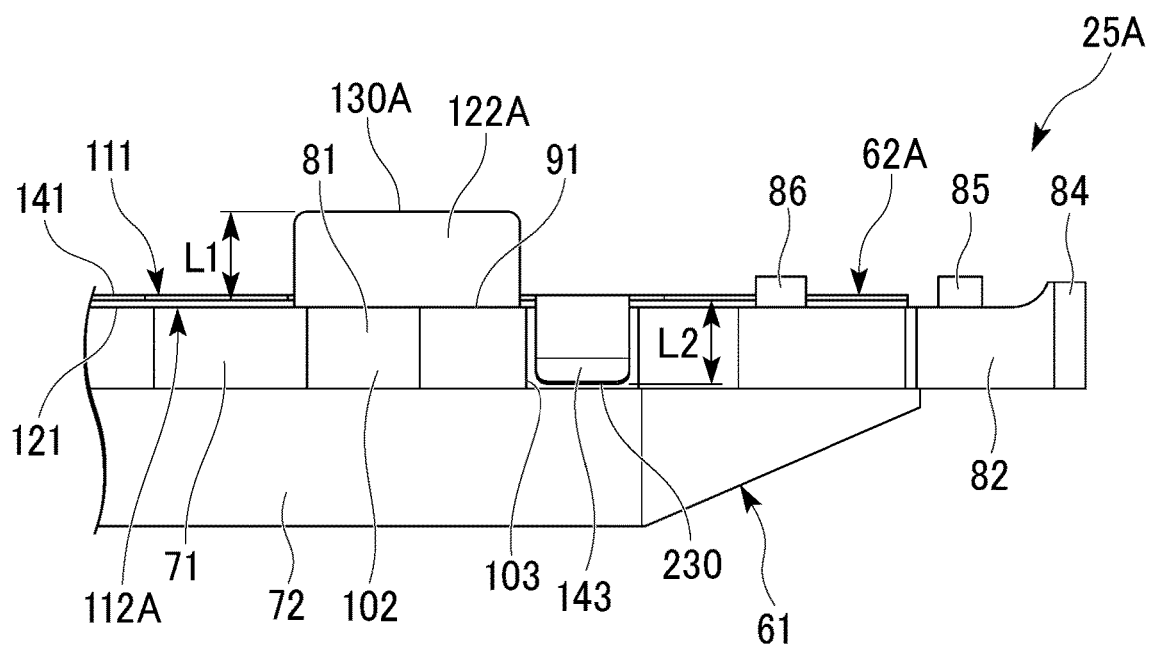
FIG. 15 is a partial bottom view illustrating a friction pad assembly of the disc brake of a second embodiment in a normal assembly state.
Figure 16:
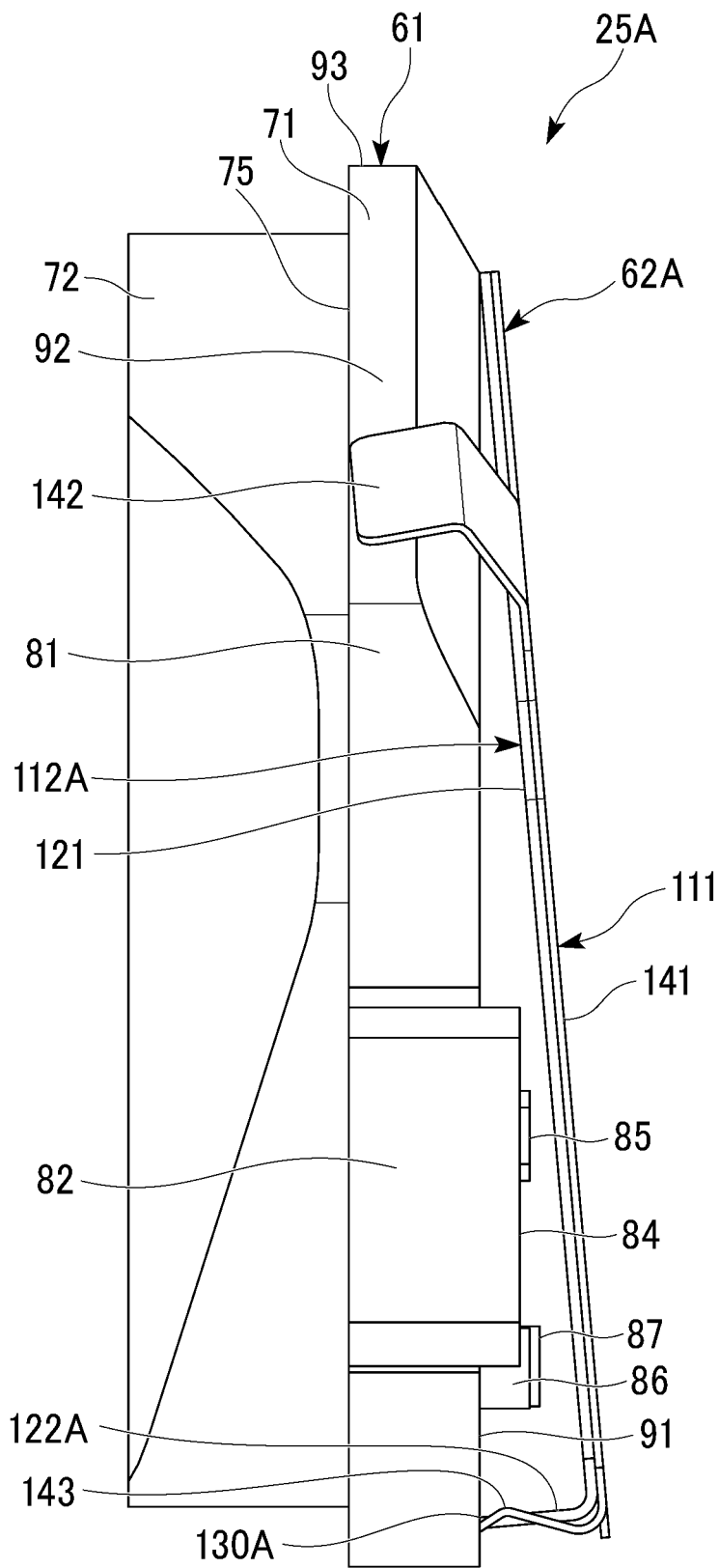
FIG. 16 is a side view illustrating the friction pad assembly of the disc brake of the second embodiment in an erroneous assembly state.
Figure 17:
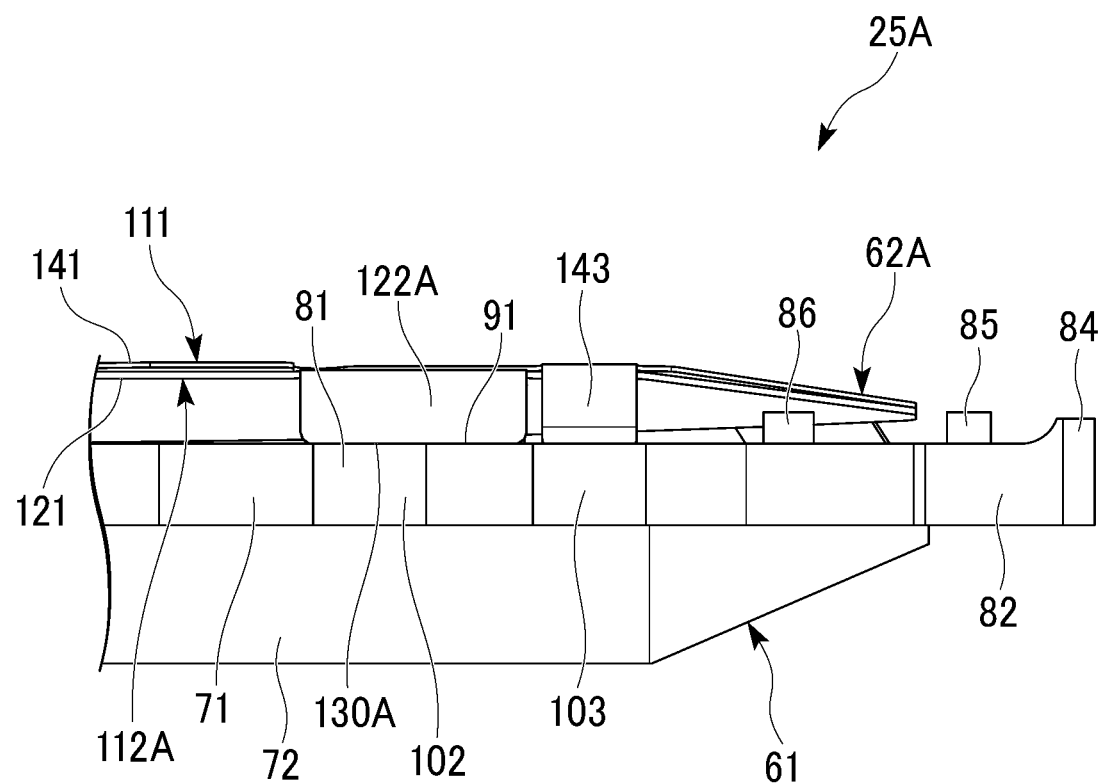
FIG. 17 is a partial bottom view illustrating the friction pad assembly of the disc brake of the second embodiment in an erroneous assembly state.

Next, a second embodiment will be described focusing on parts different from those of the first embodiment mainly on the basis of FIGS. 15 to 17. Parts common to the first embodiment will be expressed with the same names and the same reference signs.

The second embodiment has friction pad assemblies 25A having configurations partially differing from those of the friction pad assemblies 25 of the first embodiment. Each of the friction pad assemblies 25A has a laminated shim 62A having a configuration partially differing from that of the laminated shim 62 of the first embodiment. The laminated shim 62A is configured of an inner shim 112A partially differing from the inner shim 112 of the first embodiment, and the outer shim 111 similar to that of the first embodiment.

The inner shim 112A has a bent portion 122A having a configuration partially differing from that of the bent portion 122 of the first embodiment, and the flat plate portion 121 similar to the first embodiment. In the bent portion 122A of the inner shim 112A, a length L1 in a direction extending from the flat plate portion 121 is longer than a length L2 in a direction extending from the flat plate portion 141 of the claw portion 143 of the outer shim 111. The length L1 is a length from a flat surface on a side where the bent portion 122A in the plate thickness direction of the flat plate portion 121 extends to a leading end portion 130A in a direction perpendicular to the flat plate portion 121. The length L2 is a length from a flat surface on a side where the claw portion 143 in the plate thickness direction of the flat plate portion 141 extends to a leading end portion 230 in a direction perpendicular to the flat plate portion 141.

In the second embodiment, the length L1 of the bent portion 122A of the inner shim 112A is longer than the lengths L2 of the claw portions 143 of the outer shim 111. For this reason, if the inner shim 112A is reversely assembled such that it is attached in a direction in which the bent portion 122A is curved from the outer edge side of the flat plate portion 121 to a side opposite to the flat plate portion 141 of the outer shim 111, as illustrated in FIGS. 16 and 17, the bent portion 122A abuts the flat surface portion 91, and thus the flat plate portion 121 is in a state floating from the rear plate 71.

Moreover, even if the outer shim 111 comes into surface contact with the flat plate portion 141 in the flat plate portion 121 of the inner shim 112A, engagement of the claw portions 143 with the rear plate 71 is hindered by the inner shim 112A. Namely, the inner shim 112A in a reversely assembled state restricts assembly of the laminated shim 62A to the friction pad 61. Thus, the laminated shim 62A cannot be assembled to the friction pad 61. Thus, an assembly worker can reliably recognize erroneous assembly of the inner shim 112A which is inside out.

In this manner, in the second embodiment, when the inner shim 112A is intended to be attached in a direction in which the bent portion 122A is curved from the outer edge side of the flat plate portion 121 to a side opposite to the flat plate portion 141 of the outer shim 111, the length L1 of the bent portion 122A of the inner shim 112A is a length hindering engagement of the claw portions 143 of the outer shim 111 with the rear plate 71. For this, a value in which the thickness of the flat plate portion 121 is added to the length L1 of the bent portion 122A need only be equivalent to the lengths L2 of the claw portions 143.

The disc brake according to a first aspect of the embodiment described above includes an attachment member, a caliper that is provided in the attachment member in a displaceable manner in an axial direction of a disc; a friction pad that has a rear plate and a lining provided in a manner of being in contact with one surface of the rear plate and is pressed to the disc by the caliper; a first shim that has a first flat plate portion and claw portions curved from an outer edge side of the first flat plate portion and attached to an outer circumferential surface of the rear plate; and a second shim that has a second flat plate portion disposed in a manner of being sandwiched between the first flat plate portion of the first shim and the rear plate, and a bent portion curved from an outer edge side of the second flat plate portion to the first flat plate portion side. Relative movement of the second shim with respect to the first shim on a plane parallel to the second flat plate portion is restricted. A leading end of the bent portion of the second shim is disposed within a projection plane of a largest flat surface portion of the rear plate in the disc axial direction. Accordingly, it is possible to curb erroneous assembly of a shim with respect to a friction pad.

According to a second aspect, in the first aspect, a length of the bent portion of the second shim in a direction perpendicular to the second flat plate portion is equal to or longer than lengths of the claw portions of the first shim in a direction perpendicular to the first flat plate portion.

According to a third aspect, in the first or second aspect, the claw portions of the first shim are formed on a side opposite to a center of the friction pad in a disc rotation direction from the bent portion of the second shim.

According to a fourth aspect, in any one of the first to third aspects, the bent portion of the second shim is formed at an outer edge portion of the second flat plate portion on a side inward in a disc radial direction.

A laminated shim according to a fifth aspect of the embodiment is a laminated shim for a friction pad having a rear plate and a lining. The laminated shim includes a first shim that has a first flat plate portion and claw portions curved from an outer edge side of the first flat plate portion and attached to an outer circumferential surface of the rear plate; and a second shim that has a second flat plate portion disposed in a manner of being sandwiched between the first flat plate portion of the first shim and the rear plate, and a bent portion curved from an outer edge side of the second flat plate portion to the first flat plate portion side. Relative movement of the second shim with respect to the first shim on a plane parallel to the second flat plate portion is restricted. A leading end of the bent portion of the second shim is disposed within a projection plane of a largest flat surface portion of the rear plate in the disc axial direction. Accordingly, it is possible to curb erroneous assembly of a shim with respect to a friction pad.

According to a sixth aspect, in the fifth aspect, a length of the bent portion of the second shim in a direction perpendicular to the second flat plate portion is equal to or longer than lengths of the claw portions of the first shim in a direction perpendicular to the first flat plate portion.

INDUSTRIAL APPLICABILITY

According to the disc brake and the laminated shim described above, it is possible to curb erroneous assembly of a shim with respect to a friction pad.

REFERENCE SIGNS LIST

10 Disc brake
11 Disc
21 Attachment member
22 Caliper
61 Friction pad
62 Laminated shim
71 Rear plate
72 Lining
91 Flat surface portion (largest flat surface portion)
92 Outer circumferential surface
111 Outer shim (first shim)
112 Inner shim (second shim)
121 Flat plate portion (second flat plate portion)
122 Bent portion
127 Outer edge portion
130 Leading end portion
141 Flat plate portion (first flat plate portion)
142, 143 Claw portion

The invention claimed is:

1. A disc brake comprising:
an attachment member;
a caliper that is provided in the attachment member in a displaceable manner in an axial direction of a disc;
a friction pad that has a rear plate and a lining provided in a manner of being in contact with one surface of the rear plate and is pressed to the disc by the caliper;
a first shim that has a first flat plate portion and claw portions curved from an outer edge side of the first flat plate portion and attached to an outer circumferential surface of the rear plate; and
a second shim that has a second flat plate portion disposed in a manner of being sandwiched between the first flat plate portion of the first shim and the rear plate, and a bent portion curved from an outer edge side of the second flat plate portion to the first flat plate portion side,
wherein relative movement of the second shim with respect to the first shim on a plane parallel to the second flat plate portion is restricted,
wherein a leading end portion of the bent portion of the second shim is disposed within a projection plane of a largest flat surface portion of the rear plate in the disc axial direction, and
wherein a length of the bent portion of the second shim in a direction perpendicular to the second flat plate portion is longer than lengths of the claw portions of the first shim in a direction perpendicular to the first flat plate portion.

2. The disc brake according to claim 1,
wherein the claw portions of the first shim are formed on a side opposite to a center of the friction pad in a disc rotation direction from the bent portion of the second shim.

3. The disc brake according to claim 1,
wherein the bent portion of the second shim is formed at an outer edge portion of the second flat plate portion on a side inward in a disc radial direction.

4. A laminated shim for a friction pad having a rear plate and a lining, the laminated shim comprising:
- a first shim that has a first flat plate portion and claw portions curved from an outer edge side of the first flat plate portion and configured to be attached to an outer circumferential surface of the rear plate; and
- a second shim that has a second flat plate portion disposed in a manner of being sandwiched between the first flat plate portion of the first shim and the rear plate, and a bent portion curved from an outer edge side of the second flat plate portion to the first flat plate portion side, wherein relative movement of the second shim with respect to the first shim on a plane parallel to the second flat plate portion is restricted, wherein a leading end portion of the bent portion of the second shim is disposed within a projection plane of a largest flat surface portion of the rear plate in the disc axial direction, and wherein a length of the bent portion of the second shim in a direction perpendicular to the second flat plate portion is longer than lengths of the claw portions of the first shim in a direction perpendicular to the first flat plate portion.

* * * * *